US008994497B2

(12) United States Patent
Grant et al.

(10) Patent No.: US 8,994,497 B2
(45) Date of Patent: Mar. 31, 2015

(54) CABINET LOCK KEY WITH AUDIO INDICATORS

(71) Applicant: InVue Security Products Inc., Charlotte, NC (US)

(72) Inventors: Jeffrey A. Grant, Charlotte, NC (US); Christopher J. Fawcett, Charlotte, NC (US); William M. Warren, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 13/897,790

(22) Filed: May 20, 2013

(65) Prior Publication Data

US 2013/0307668 A1 Nov. 21, 2013

Related U.S. Application Data

(60) Provisional application No. 61/649,539, filed on May 21, 2012.

(51) Int. Cl.
*B60R 25/00* (2013.01)
*G07C 9/00* (2006.01)

(52) U.S. Cl.
CPC ........ *G07C 9/00857* (2013.01); *G07C 9/00896* (2013.01); *G07C 2009/00936* (2013.01); *G07C 2209/62* (2013.01)
USPC ........................................................ 340/5.73

(58) Field of Classification Search
None
See application file for complete search history.

(56) References Cited

U.S. PATENT DOCUMENTS

| | | | | |
|---|---|---|---|---|
| 4,031,434 | A | 6/1977 | Perron et al. | |
| 4,250,533 | A | 2/1981 | Nelson | |
| 4,286,305 | A | 8/1981 | Pilat et al. | |
| 4,829,296 | A | 5/1989 | Clark et al. | |
| 4,908,605 | A * | 3/1990 | Takatsuka | 340/542 |
| 4,922,229 | A | 5/1990 | Guenst | |
| 5,117,097 | A | 5/1992 | Kimura et al. | |
| 5,140,317 | A | 8/1992 | Hyatt, Jr. et al. | |
| 5,280,518 | A * | 1/1994 | Danler et al. | 379/102.06 |
| 5,479,799 | A | 1/1996 | Kilman et al. | |
| 5,605,066 | A | 2/1997 | Hurskainen | |
| 5,745,044 | A | 4/1998 | Hyatt, Jr. et al. | |
| 5,758,522 | A | 6/1998 | York | |

(Continued)

FOREIGN PATENT DOCUMENTS

| | | | |
|---|---|---|---|
| CN | 201297072 | Y | 8/2009 |
| DE | 202008011189 | U1 | 12/2009 |

(Continued)

OTHER PUBLICATIONS

"Notification of Transmittal of International Search Report and Written Opinion of the International Searching Authority, or the Declaration" in counterpart International Patent Application No. PCT/US2013/041817; mailed Aug. 27, 2013; 10 pages.

(Continued)

*Primary Examiner* — Curtis King
(74) *Attorney, Agent, or Firm* — InVue Security Products Inc.

(57) ABSTRACT

An electronic key for a merchandise security device is provided. The electronic key may include electronic circuitry for providing electrical power to a lock mechanism for locking and unlocking the lock mechanism. The electronic key may also include an audio component configured to indicate a status of the lock mechanism.

15 Claims, 22 Drawing Sheets

(56) References Cited

U.S. PATENT DOCUMENTS

| | | | | |
|---|---|---|---|---|
| 5,848,541 | A | 12/1998 | Glick et al. | |
| 5,905,446 | A | 5/1999 | Benore et al. | |
| 6,005,487 | A | 12/1999 | Hyatt, Jr. et al. | |
| 6,297,725 | B1 | 10/2001 | Tischendorf et al. | |
| D457,051 | S | 5/2002 | Davis | |
| 6,384,711 | B1 | 5/2002 | Cregger et al. | |
| 6,474,122 | B2 | 11/2002 | Davis | |
| 6,496,101 | B1 * | 12/2002 | Stillwagon | 340/5.61 |
| 6,525,644 | B1 | 2/2003 | Stillwagon | |
| 6,564,600 | B1 | 5/2003 | Davis | |
| 6,575,005 | B1 | 6/2003 | Hunter | |
| 6,604,394 | B2 | 8/2003 | Davis | |
| 6,615,625 | B2 | 9/2003 | Davis | |
| 6,718,806 | B2 | 4/2004 | Davis | |
| 6,886,382 | B1 * | 5/2005 | St. Felix | 70/432 |
| 6,895,792 | B2 | 5/2005 | Davis | |
| 6,960,991 | B2 | 11/2005 | Orcifalvi et al. | |
| D579,318 | S | 10/2008 | Davis | |
| 7,698,916 | B2 | 4/2010 | Davis | |
| 7,737,843 | B2 | 6/2010 | Belden, Jr. et al. | |
| 7,737,844 | B2 | 6/2010 | Scott et al. | |
| 7,737,845 | B2 | 6/2010 | Fawcett et al. | |
| 7,737,846 | B2 | 6/2010 | Belden, Jr. et al. | |
| 7,969,305 | B2 | 6/2011 | Belden, Jr. et al. | |
| 2002/0024420 | A1 | 2/2002 | Ayala et al. | |
| 2002/0158762 | A1 | 10/2002 | Nguyen et al. | |
| 2002/0180582 | A1 | 12/2002 | Nielsen | |
| 2002/0185397 | A1 | 12/2002 | Sedon et al. | |
| 2003/0115918 | A1 * | 6/2003 | Hunter | 70/432 |
| 2004/0027236 | A1 * | 2/2004 | Zhai | 340/5.6 |
| 2004/0080403 | A1 * | 4/2004 | Eshel | 340/425.5 |
| 2007/0131005 | A1 | 6/2007 | Clare | |
| 2007/0194918 | A1 | 8/2007 | Rabinowitz et al. | |
| 2007/0296545 | A1 | 12/2007 | Clare | |
| 2008/0224655 | A1 | 9/2008 | Tilley et al. | |
| 2008/0252415 | A1 | 10/2008 | Larson et al. | |
| 2008/0289383 | A1 * | 11/2008 | Levine | 70/432 |
| 2009/0013736 | A1 | 1/2009 | Voosen | |
| 2009/0085717 | A1 | 4/2009 | Kirkjan | |
| 2009/0096413 | A1 | 4/2009 | Partovi et al. | |
| 2009/0249846 | A1 | 10/2009 | Gokcebay | |
| 2011/0084840 | A1 | 4/2011 | Mercier et al. | |
| 2011/0254661 | A1 | 10/2011 | Fawcett et al. | |
| 2011/0320352 | A1 * | 12/2011 | Mehew et al. | 705/44 |
| 2012/0047972 | A1 | 3/2012 | Grant et al. | |
| 2012/0119910 | A1 | 5/2012 | Belden, Jr. et al. | |
| 2013/0081434 | A1 | 4/2013 | Grant et al. | |

FOREIGN PATENT DOCUMENTS

| | | | |
|---|---|---|---|
| FR | 2782402 | A1 | 2/2000 |
| GB | 1531951 | | 11/1978 |
| WO | 9207156 | A1 | 4/1992 |
| WO | 9947774 | A1 | 9/1999 |
| WO | 0242584 | A1 | 5/2002 |
| WO | 2004093017 | A1 | 10/2004 |
| WO | 2005078667 | A1 | 8/2005 |
| WO | 2008034022 | A2 | 3/2008 |
| WO | 2009014943 | A1 | 1/2009 |
| WO | 2012007775 | A1 | 1/2012 |
| WO | 2012-014143 | A2 | 2/2012 |

OTHER PUBLICATIONS

Notification of Transmittal of International Search Report and Written Opinion of the International Searching Authority, or the Declaration in International Patent Application No. PCT/US2012/057784; 9 pages.

Notification of Transmittal of International Search Report and Written Opinion of the International Searching Authority, or the Declaration in International Patent Application No. PCT/US2011/050130; 12 pages.

Videx, Inc., "CyberLock a Complete Access Control System in Every Lock Core", 2010, pp. 1-16, Videx, Inc., Corvallis, Oregon.

Yolaine Cussac, International Search Report, Mar. 14, 2013, pp. 1-8, The International Bureau of WIPO, Geneva, Switzerland.

Wayback Machine, SAAA Specialists in the Protection Against Shoplifting, Nov. 24, 2006, 3 pages, Gallardon, France (available at the Wayback Machine website).

Videx, CyberKey Tones and Descriptions, Feb. 5, 2008, 2 pages, Videx, Corvallis, Oregon (available at http//www.kenstan.com/pdf/cyberlock_key_tones.pdf).

David G. Allen, The Kenstan Cyberlock, Jan.-Feb. 2009, 1 page, Kenstan Lock Company, Plainview, New York.

Kenstan, Kassoy the World Leader in Jewelry Supply, 2010 Catalog, 2 pages, Kenstan Lock Company (available at http://www.kenstan.com).

European Patent Office, Rule 161 a EPC communication, Apr. 9, 2013, pp. 1-7, Rijswijk, Netherlands.

http://www.videx.com/AC_PDFs/Product%20Sheets/CK-GM.pdf; "Grand Master Key"; 2 pages.

http://www.lockingsystems.com/Pfd_Files/nexgen_xt_SFIC.pdf; "SFIC Locks NEXGEN XT"; 1 page.

* cited by examiner

| Asset | Starting State | If | Then |
|---|---|---|---|
| Key  | (silent) | "Beep" | "BeepBeep" repeat for 120 seconds or until relocked successfully |
| Lock  | (locked)  | (unlocked)  | (unlocked)  |

| Asset | Starting State | If | Then | If | Then |
|---|---|---|---|---|---|
| Key  | (silent) | "Beep" | (silent) | "BuzzBuzz" | "BuzzBuzz" repeat for 120 seconds or until relocked successfully |
| Lock  | (unlocked)  | (locked)  | (locked)  | (error)  | (error)  |

| Asset | Starting State | If | Then |
|---|---|---|---|
| Key  | (silent) | "BuzzBuzz" | "BuzzBuzz" repeat for 120 seconds or until relocked successfully |
| Lock  | (locked)  | (unlocked)  | (unlocked)  |

| Asset | Starting State | If | Then | If | Then |
|---|---|---|---|---|---|
| Key  | (silent) | "BuzzBuzz" | "BuzzBuzz" repeat for 120 seconds or until next interaction | "BuzzBuzz" | "BuzzBuzz" repeat for 120 seconds or until relocked successfully |
| Lock  | (unlocked)  | (locked)  | (locked)  | (error)  | (error)  |

CABINET LOCK KEY WITH AUDIO INDICATORS

CROSS REFERENCE TO RELATED APPLICATIONS

This non-provisional application claims the benefit of U.S. Provisional Application No. 61/649,539 filed on May 21, 2012, which is hereby incorporated by reference in its entirely.

FIELD OF THE INVENTION

Embodiments of the present invention relate generally to merchandise display security systems and methods for protecting an item of merchandise from theft. More particularly, embodiments of the present invention relate to an electronic key for a merchandise security device.

BACKGROUND OF THE INVENTION

It is common practice for retailers to store and/or display relatively expensive items of merchandise on or within a merchandise security device, such as a security display (e.g. alarming stand), security fixture (e.g. locking hook, shelf, cabinet, etc.) or security packaging (e.g. merchandise keeper). Regardless, the security device stores and/or displays an item of merchandise so that a potential purchaser may view, and in some instances, interact with the item before making a decision whether to purchase the item. At the same time, the item is secured on or within the merchandise security device so as to prevent, or at least deter, theft of the item. The value of the item, however, may make it an attractive target for a shoplifter despite the presence of a merchandise security device. A determined shoplifter may attempt to detach the item from the security display or to remove the item from the security fixture or from within the security packaging. Alternatively, the shoplifter may attempt to remove the all or a portion of the security device from the display area along with the item.

In the case of a secure display or fixture, the security device is oftentimes firmly attached to a support, such as a pegboard, wire grid, horizontal bar rack, slatwall (also known as slatboard), wall, table, desk, countertop or like structure. In some instances, the security device is secured to the support using a mechanical lock mechanism operated by a non-programmable key, for example a conventional tumbler lock or a magnetic lock. In other instances, the security device is secured to the support using an electronic lock mechanism operated by a programmable key or remote.

There are known locking systems that utilize a key to transfer power from the key to a lock or locking device using inductive power transfer technology. Some cabinet locks include a visual indicator on the cabinet lock to indicate the status of the lock. However, there is no known power transfer key that includes an audio indicator for indicating the status of the lock or locking device operated by the key.

Accordingly, there exists a need for an improved programmable key for operating a merchandise security device. There also exists a need for a programmable key that is configured to provide an audio indicator indicative of the status of a lock mechanism.

BRIEF SUMMARY OF THE INVENTION

According to embodiments of the present invention, an electronic key for a merchandise security device is provided. The electronic key includes electronic circuitry for providing electrical power to a lock mechanism for locking and unlocking the lock mechanism. The electronic key further includes an audio component configured to indicate a status of the lock mechanism. For example, the audio component may be configured to emit an audible signal in response to the lock mechanism being locked or unlocked. In some embodiments, the audio component is configured to emit a first audible signal and a second audible signal that is different than the first audible signal. The audible signal may be continuous or intermittent.

According to another embodiment, a method for protecting an item of merchandise from theft is provided. The method includes transferring electrical power from an electronic key to a lock to thereby lock or unlock the lock and emitting an audible signal with the electronic key in response to a change in state of the lock.

BRIEF DESCRIPTION OF THE DRAWINGS

The detailed description of the invention provided below may be better understood with reference to the accompanying drawing figures, which depict one or more exemplary embodiments of an electronic key for use with a merchandise security device in a merchandise display security system and method according to the invention.

DETAILED DESCRIPTION OF EMBODIMENTS OF THE INVENTION

Figure 1A:
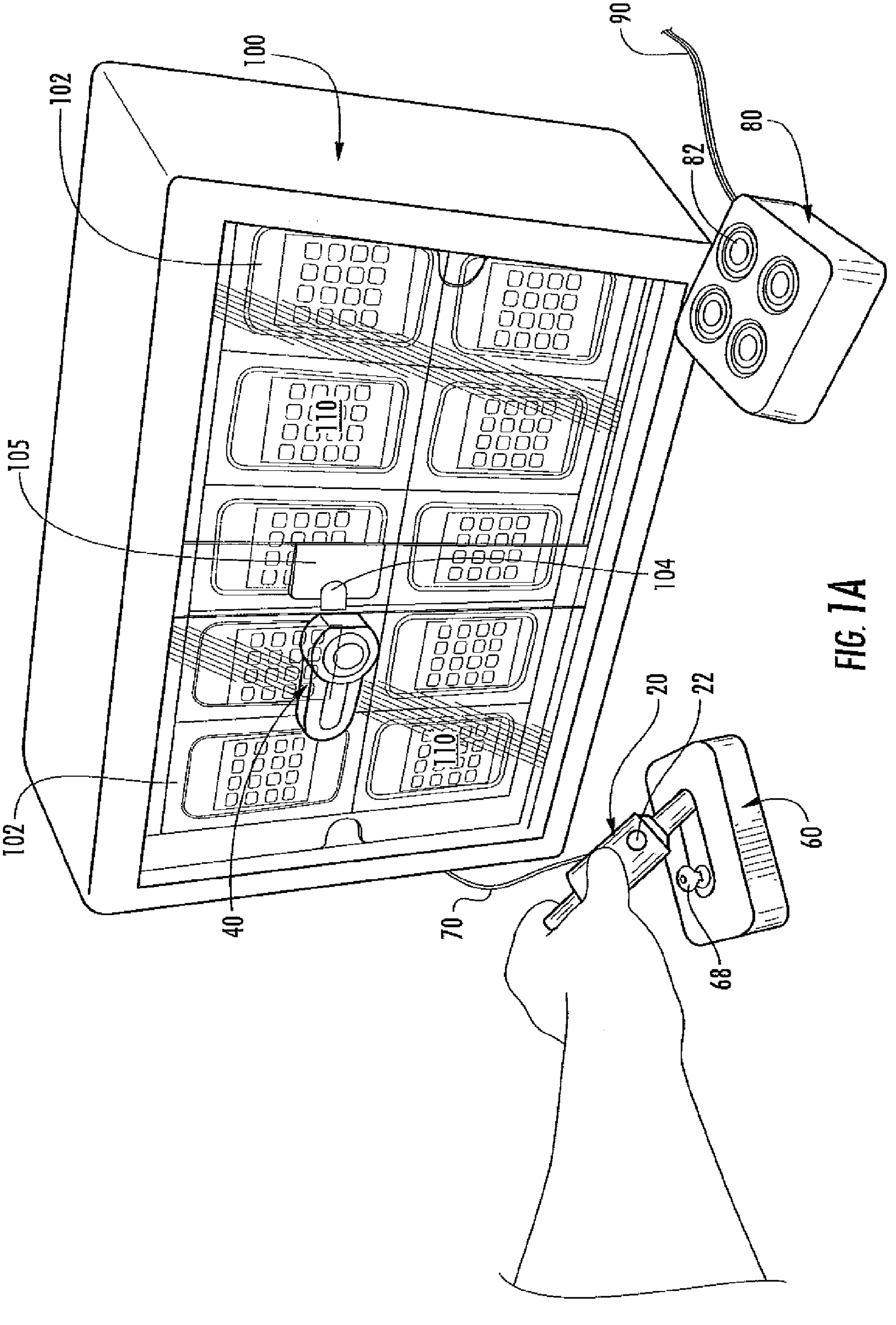
FIG. 1A shows an exemplary embodiment of a merchandise display security system and method including a programmable electronic key, a merchandise security device, a programming station and a charging station according to the invention.

As explained in greater detail below, embodiments of the present invention are directed to an electronic key for a cabinet lock including one or more audio indicators for indicating the status of the cabinet lock. In one embodiment, the electronic key includes electronic circuitry and an audio component (e.g., a piezo or piezoelectric alarm) that provides a first audio indication indicating to a user the cabinet lock is in an unlocked (unsecured) condition. In another embodiment, the key includes electronic circuitry and an audio component that provides a second audio indication different from the first audio indication indicating to a user the status of the cabinet lock was not successfully changed, and more particularly, the status of the cabinet lock was not changed from a locked stated to an unlocked state or from an unlocked state to a locked state.

In some embodiments, the electronic lock and the electronic key are similar to those disclosed in U.S. Patent Publ. No. 2013/0081434, entitled Cabinet Lock for Use with Programmable Electronic Key and filed Sep. 28, 2012, U.S. Patent Publ. No. 2012/0047972, entitled Electronic Key for Merchandise Security Device and filed Aug. 31, 2011, and U.S. Patent Publ. No. 2011/0254661, entitled Programmable Security System and Method for Protecting Merchandise and filed Jun. 27, 2011. In other embodiments, the electronic lock and the electronic key are similar to those manufactured by InVue Security Products Inc., including the Plunger Locks, Smart Locks, and IR2 and IR2-S Keys.

Referring now to the accompanying drawing figures wherein like reference numerals denote like elements throughout the various views, one or more exemplary embodiments of a merchandise display security system and method are shown. In the exemplary embodiments shown and described herein, the system and method include a programmable electronic key, indicated generally at 20, 120, 200 and a merchandise security device, indicated generally at 40, 140. Merchandise security devices 40, 140 suitable for use with the programmable electronic keys 20, 120, 200 include, but are not limited to, a security display (e.g. alarming stand), security fixture (e.g. locking hook, shelf, cabinet, etc.) or security packaging (e.g. merchandise keeper) for an item of merchandise. However, a programmable electronic key (also referred to herein as a merchandise security key) according to the invention is useable with any security device or locking device that utilizes power transferred from the key to operate a mechanical lock mechanism and/or utilizes data transferred from the key to authorize the operation of an electronic lock mechanism, such as an alarm circuit. In other words, a programmable electronic key according to the invention is useable with any security device or locking device that requires power transferred from the key to the device and/or data transferred from the key to the device. Further examples of security devices and locking devices include, but are not limited to, a door lock, a drawer lock or a shelf lock, as well as any device that prevents an unauthorized person from accessing, removing or detaching an item from a secure location or position. It should be noted that although the invention is described with respect to embodiments including a programmable electronic key for transferring data and electrical power to a merchandise security device to operate a mechanical lock mechanism, the invention is equally applicable to an electronic key for transferring only electrical power to a merchandise security device to operate any component of the merchandise security device, whether or not the device includes an internal or external power source for operating another component of the device.

One embodiment of a merchandise display system and method according to the invention is illustrated in FIGS. 1A-9B. The embodiment of the merchandise display security system and method depicted comprises a programmable electronic key 20, which is also referred to herein as a merchandise security key, and a merchandise security device 40 that is configured to be operated by the key. The system and method may further comprise an optional programming station, indicated generally at 60, that is operable for programming the key 20 with a security code, which is also referred to herein as a Security Disarm Code (SDC). In addition to programming station 60, the system and method may further comprise an optional charging station, indicated generally at 80, that is operable for initially charging and/or subsequently recharging a power source disposed within the key 20. For example, merchandise security key 20 and merchandise security device 40 may each be programmed with the same SDC into a respective permanent memory. The merchandise security key 20 may be provisioned with a single-use (i.e. non-rechargeable) power source, such as a conventional or extended-life battery, or alternatively, the key may be provisioned with a multiple-use (i.e. rechargeable) power source, such as a conventional capacitor or rechargeable battery. In either instance, the power source may be permanent, semi-permanent (i.e. replaceable), or rechargeable, as desired. In the latter instance, charging station 80 is provided to initially charge and/or to subsequently recharge the power source provided within the merchandise security key 20. Furthermore, key 20 and/or merchandise security device 40 may be provided with only a transient memory, such that the SDC must be programmed (or reprogrammed) at predetermined time intervals. In this instance, programming station 60 is provided to initially program and/or to subsequently reprogram the SDC into the key 20. As will be described, key 20 is operable to initially program and/or to subsequently reprogram the merchandise security device 40 with the SDC. Key 20 is then further operable to operate the merchandise security device 40 by transferring power and/or data to the device, as will be described.

In the embodiment of the system and method illustrated in FIGS. 1A-9B, programmable electronic key 20 is configured to be programmed with a unique SDC by the programming station 60. A programming station 60 suitable for use with the present invention is shown and described in detail in U.S. Pat. No. 7,737,844 entitled PROGRAMMING STATION FOR A SECURITY SYSTEM FOR PROTECTING MERCHANDISE, the disclosure of which is incorporated herein by reference in its entirety. As illustrated in FIG. 1A and best shown in enlarged FIG. 1B, the key 20 is presented to the programming station 60 and communication therebetween is initiated, for example by pressing a control button 22 provided on the exterior of the key. Communication between the programming station 60 and the key may be accomplished directly, for example by one or more electrical contacts, or indirectly, for example by wireless communication. Any form of wireless communication capable of transferring data between the programming station 60 and key 20 is also possible, including without limitation optical transmission, acoustic transmission or magnetic induction. In the embodiments shown and described herein, communication between programming station 60 and key 20 is accomplished by wireless optical transmission, and more particularly, by cooperating infrared (IR) transceivers provided in the programming station and the key. In one embodiment, the programming station comprises at least a logic control circuit for generating or being provided with a SDC, a memory for storing the SDC, and a communications system suitable for interacting with the programmable electronic key 20 in the manner described herein to program the key with the SDC.

Figure 1B:
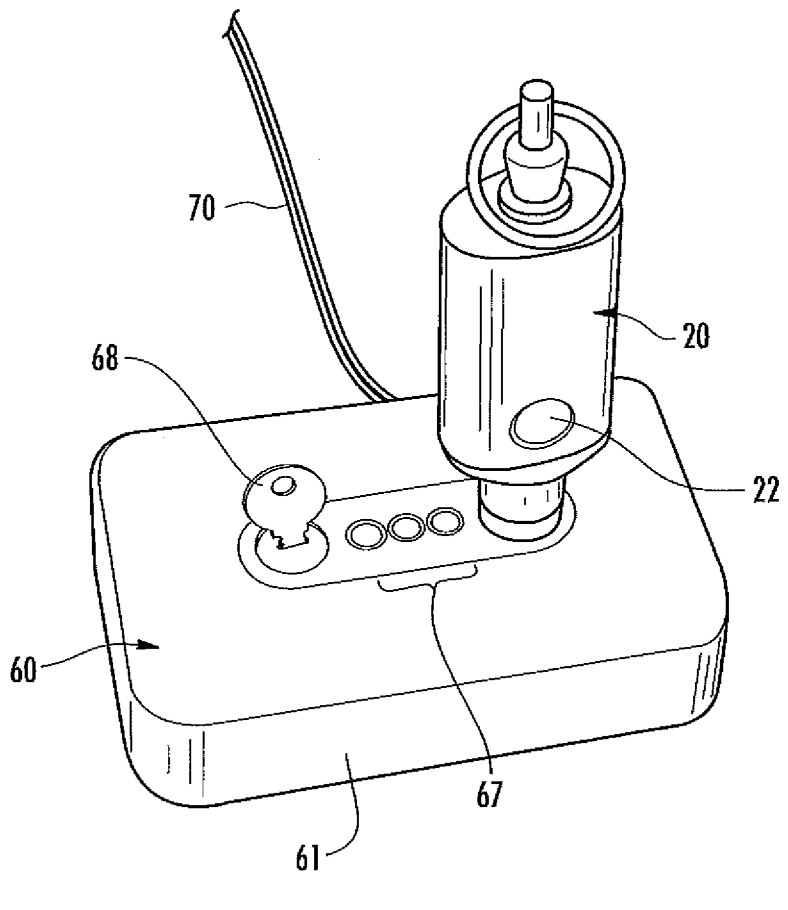
FIG. 1B is an enlarged view showing the programmable electronic key of FIG. 1A positioned on the programming station of FIG. 1A to be programmed with a security code.

As shown in FIG. 1B, programming station 60 comprises a housing 61 configured to contain the logic control circuit that generates the SDC, the memory that stores the SDC, and a communications system, namely an optical transceiver, for wirelessly communicating the SDC to a cooperating optical transceiver disposed within the key 20. In use, the logic control circuit generates the SDC, which may be a predetermined (i.e. "factory preset") security code, or which may be a security code that is randomly generated by the logic control circuit of the programming station 60 at the time a first key 20 is presented to the station for programming. In the latter instance, the logic control circuit further comprises a random number generator for producing the unique SDC. A series of visual indicators, for example light-emitting diodes (LEDs) 67 may be provided on the exterior of the housing 61 for indicating the operating status of the programming station. As shown herein, the programming station 60 may be operatively connected to an external power source by a power cord 70 having at least one conductor. Alternatively, the programming station 60 may comprise an internal power source, for example an extended-life replaceable battery or a rechargeable battery, for providing power to the logic control circuit and the LEDs 67.

In a particular embodiment, the logic control circuit of the programming station 60 performs an electronic exchange of data with a logic control circuit of the key 20, commonly referred to as a "handshake communication protocol." The handshake communication protocol determines whether the key is an authorized key that has not been programmed previously (i.e. a "new" key), or is an authorized key that is being presented to the programming station a subsequent time to refresh the SDC. In the event that the handshake communication protocol fails, the programming station 60 will not provide the SDC to the unauthorized device attempting to obtain the SDC, for example an infrared reader on a counterfeit key. When the handshake communication protocol succeeds, programming station 60 permits the SDC randomly generated by the logic control circuit and/or stored in the memory of the station to be transmitted by the optical transceiver to the cooperating optical transceiver disposed within the key 20. As will be readily apparent to those skilled in the art, the SDC may be transmitted from the programming station 60 to the merchandise security key 20 alternatively by any other suitable means, including without limitation, electrical contacts or electromechanical, electromagnetic or magnetic conductors, as desired.

It is understood that in other embodiments, the programmable electronic key 20 may be programmed without use of a programming station 60. For example, the key 20 may be self-programming or could be pre-programmed with a particular security code.

Figure 2:
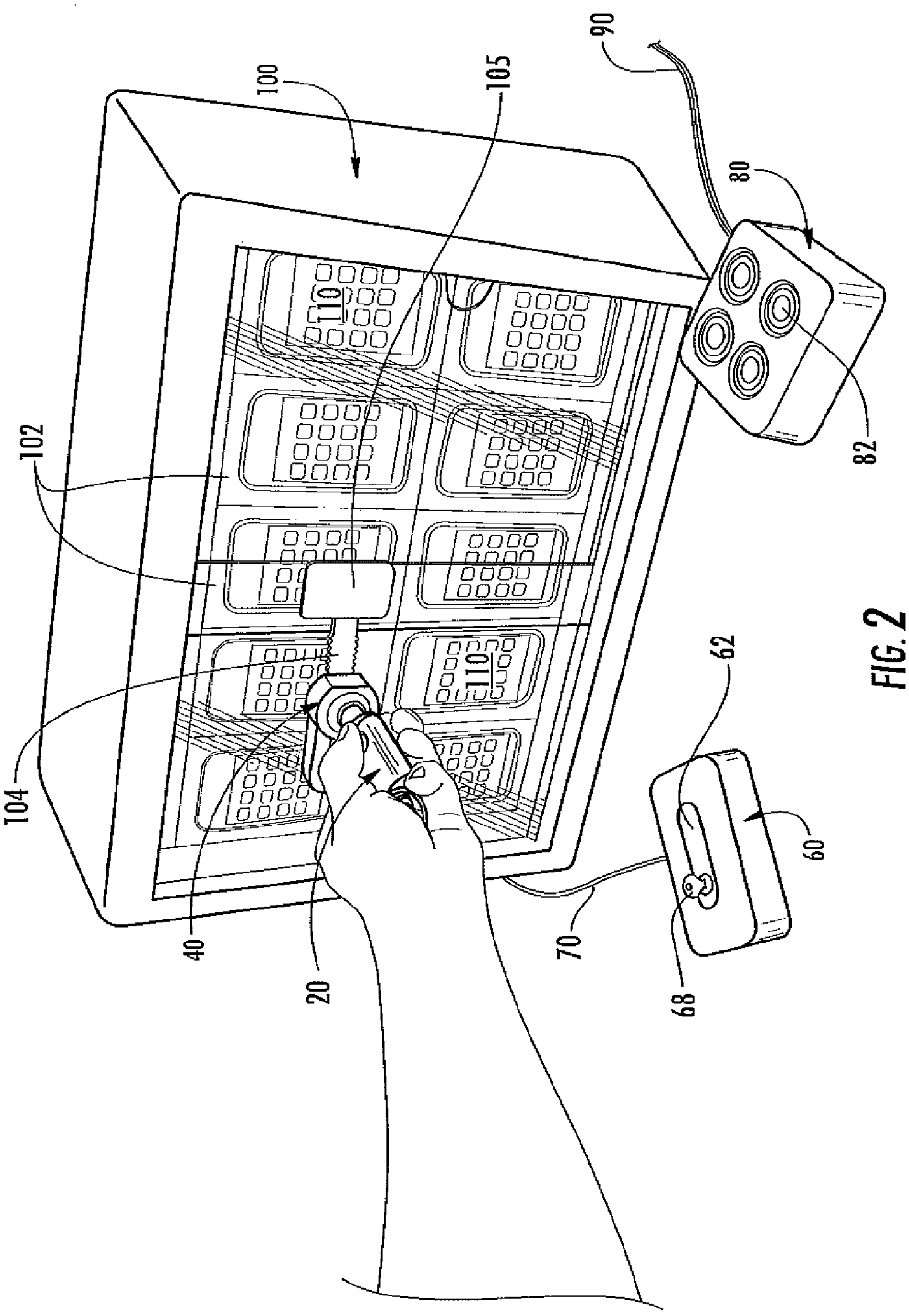
FIG. 2 further shows the system and method of FIG. 1A with the programmable electronic key positioned to operate the merchandise security device.

As illustrated in FIG. 2, the merchandise security key 20 programmed with the SDC is then positioned to operatively engage the merchandise security device 40. In the embodiments shown and described herein, the merchandise security device is a conventional cabinet lock that has been modified to be unlocked by the programmable electronic key 20. Preferably, the merchandise security device 40 is a "passive" device. As used herein, the term passive is intended to mean that the security device 40 does not have an internal power source sufficient to lock and/or unlock a mechanical lock mechanism. Significant cost savings are obtained by a retailer when the merchandise security device 40 is passive since the expense of an internal power source is confined to the merchandise security key 20, and one such key is able to operate multiple security devices. If desired, the merchandise security device 40 may also be provided with a temporary power source (e.g., capacitor or limited-life battery) having sufficient power to activate an alarm, for example, a piezoelectric audible alarm, that is actuated by a sensor, for example a contact, proximity or limit switch, in response to a security breach. The temporary power source may also be sufficient to communicate data, for example a SDC, from the merchandise security device 40 to the merchandise security key 20 to authenticate the security device and thereby authorize the key to provide power to the security device.

The merchandise security device 40 further comprises a logic control circuit, similar to the logic control circuit disposed within the key 20, adapted to perform a handshake communication protocol with the logic control circuit of the key in essentially the same manner as that between the programming station 60 and the key. In essence, the logic control circuit of the key 20 and the logic control circuit of the merchandise security device 40 communicate with each other to determine whether the merchandise security device is an authorized device that does not have a security code, or is a device having a proper (i.e. matching) SDC. In the event the handshake communication protocol fails (e.g. the device is not authorized or the device has a non-matching SDC), the key 20 will not program the device 40 with the SDC, and consequently, the merchandise security device will not operate. If the merchandise security device 40 was previously programmed with a different SDC, the device will no longer communicate with the merchandise security key 20. In the event the handshake communication protocol is successful, the merchandise security key 20 permits the SDC stored in the key to be transmitted by the optical transceiver disposed within the key to a cooperating optical transceiver disposed within the merchandise security device 40 to program the device with the SDC. As will be readily apparent to those skilled in the art, the SDC may be transmitted from the merchandise security key 20 to the merchandise security device 40 alternatively by any other suitable means, including without limitation, via one or more electrical contacts, or via electromechanical, electromagnetic or magnetic conductors, as desired. Furthermore, the SDC may be transmitted by inductive transfer of data from the programmable electronic key 20 to the programmable merchandise security device 40.

On the other hand, when the handshake communication protocol is successful and the merchandise security device 40 is an authorized device having the same (i.e. matching) SDC, the logic control circuit of the key 20 causes the internal power source of the key to transfer electrical power to the device to operate the mechanical lock mechanism. In the exemplary embodiment of FIGS. 1A-9B, electrical contacts disposed on the merchandise security key 20 electrically couple with cooperating electrical contacts on the merchandise security device 40 to transfer power from the internal battery of the key to the merchandise security device. Power may be transferred directly to the mechanical lock mechanism, or alternatively, may be transferred to a power circuit disposed within the merchandise security device 40 that operates the mechanical lock mechanism of the security device. In the embodiment of FIGS. 1A-9B, the merchandise security device (cabinet lock) 40 is affixed to one of the pair of adjacent and overlapping sliding doors 102 of a conventional merchandise display cabinet 100 of the type suitable for use, for example, in a retail store. The cabinet 100 may contain expensive items of merchandise 110, such as cellular (mobile) telephones, digital cameras, Global Positioning Satellite (GPS) devices, and the like. The doors 102 overlap medially between the ends of the cabinet 100 and the cabinet lock 40 is secured on an elongate locking arm 104 of a lock bracket 105 affixed to the inner door. In the illustrated example, the key 20 transfers power to an electric motor, such as a DC stepper motor, solenoid, or the like, that unlocks the lock mechanism of the cabinet lock 40 so that the cabinet lock can be removed from the arm 104 of the bracket 105 and the doors moved (i.e. slid) relative to one another to access the items of merchandise 110 stored within the cabinet 100. As shown, the arm 104 of the bracket 105 is provided with one-way ratchet teeth 106 and the cabinet lock 40 is provided with complimentary ratchet pawls (not shown) in a conventional manner so that the key 20 is not required to lock the cabinet lock 40 onto the inner door 102 of the cabinet 100. If desired, however, the cabinet lock 40 can be configured to require use of the key 20 to both unlock and lock the cabinet lock.

It will be readily apparent to those skilled in the art that the cabinet lock illustrated herein is but one of numerous types of passive merchandise security devices 40 that can be configured to be operated by a programmable electronic key 20 according to the present invention. By way of example and without limitation, merchandise security device 40 may be a locking base for securing a merchandise display hook to a display support, such as pegboard, slatwall, bar stock or wire grid, or may be a locking end assembly for preventing the rapid removal of merchandise from the merchandise display hook. Alternatively, the merchandise security device 40 may be a merchandise security display stand comprising a mechanical lock mechanism for securing the display stand to a display support, such as a table, counter, desk, wall, or other support. Alternatively, the merchandise security device 40 may be incorporated into packaging for one or more items of merchandise comprising a mechanical lock mechanism for separating the packaging from the merchandise or for removing the merchandise from the packaging. Still further, the merchandise security device 40 may be a conventional door or window lock for preventing access to a room, booth, box or other enclosure. In any of the aforementioned embodiments, the merchandise security device 40 may further comprise an electronic lock mechanism, such as a conventional proximity, limit or contact switch, including an associated monitoring circuit that activates an alarm in response to the switch being actuated or the integrity of a sense loop monitored by the monitoring circuit being compromised. In such embodiments the merchandise security device 40 comprises a logic control circuit, or the equivalent, including a memory for storing a SDC, and a communication system for initially receiving the SDC from the merchandise security key 20 and subsequently communicating with the key to authenticate the SDC of the key.

Figure 3A:
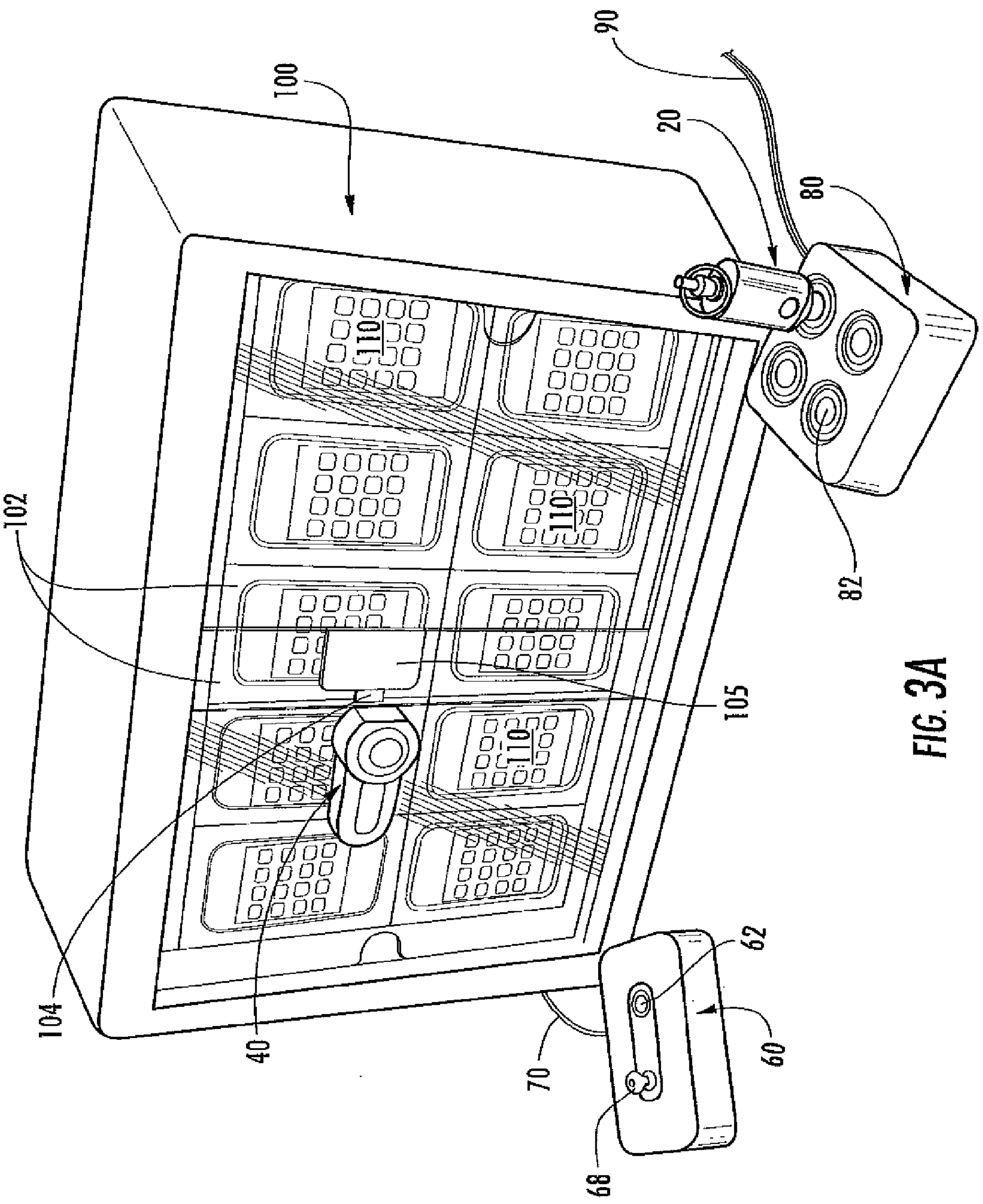
FIG. 3A further shows the system and method of FIG. 1A with the programmable electronic key disposed on the charging station.
Figure 3B:
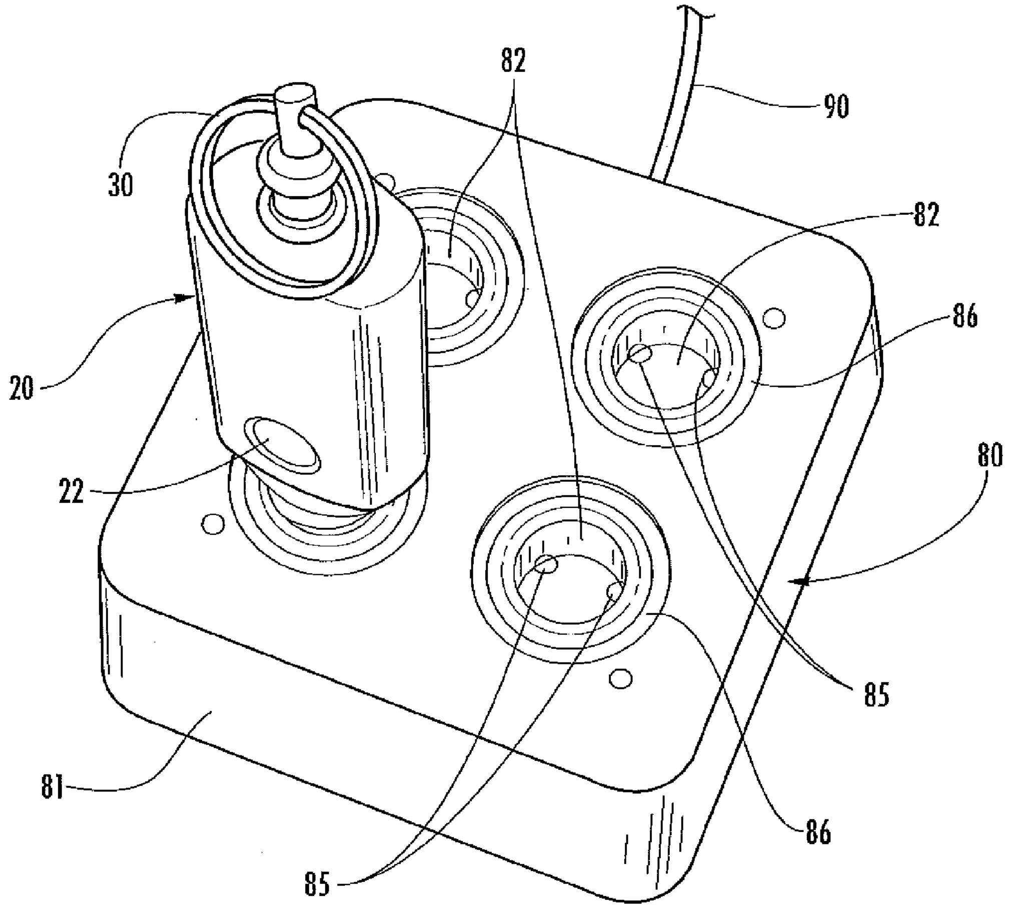
FIG. 3B is an enlarged view showing the programmable electronic key of FIG. 1A positioned on the charging station of FIG. 1A to recharge a power source disposed within the key.

As illustrated in FIG. 3A and shown enlarged in FIG. 3B, the merchandise security system may also include a charging station 80 for initially charging and subsequently recharging a rechargeable battery disposed within the merchandise security key 20. The charging station 80 comprises at least one, and preferably, a plurality of charging ports 82 each sized and shaped to receive a key 20 to be charged or recharged. As will be described in greater detail with reference to FIGS. 9A and 9B, each charging port 82 comprises at least one, and preferably, a plurality of magnets 85 for securely positioning and retaining the key 20 within the charging port 82 in electrical contact with the charging station 80. If desired, the charging station 80 may comprise an internal power source, for example, an extended-life replaceable battery or a rechargeable battery, for providing power to up to four keys 20 positioned within respective charging ports 82. Alternatively, and as shown herein, charging station 80 may be operatively connected to an external power source by a power cord 90 having at least one conductor.

An available feature of a merchandise security system and method according to the invention is that the logic control circuit of the programmable electronic key 20 may include a time-out function. More particularly, the ability of the key 20 to transfer data and power to the merchandise security device 40 is deactivated after a predetermined time period. By way of example, the logic control circuit may be deactivated after about six to twelve hours (e.g., about eight hours) from the time the key was programmed or last refreshed by the programming station 60. In this manner, an authorized sales associate typically must program or refresh the key 20 assigned to him at the beginning of each work shift. Furthermore, the charging station 80 may be configured to deactivate the logic control circuit of the key 20 (and thereby prevent use of the SDC) when the key is positioned within a charging port 82. In this manner, the charging station 80 can be made available to an authorized sales associate in an unsecured location without risk that a charged key 20 could be removed from the charging station and used to maliciously disarm and/or unlock a merchandise security device 40. The merchandise security key 20 would then have to be programmed or refreshed with the SDC by the programming station 60, which is typically monitored or maintained at a secure location, in order to reactivate the logic control circuit of the key. If desired, the charging station 80 may alternatively require a matching handshake communication protocol with the programmable electronic key 20 in the same manner as the merchandise security device 40 and the key.

Figure 4:
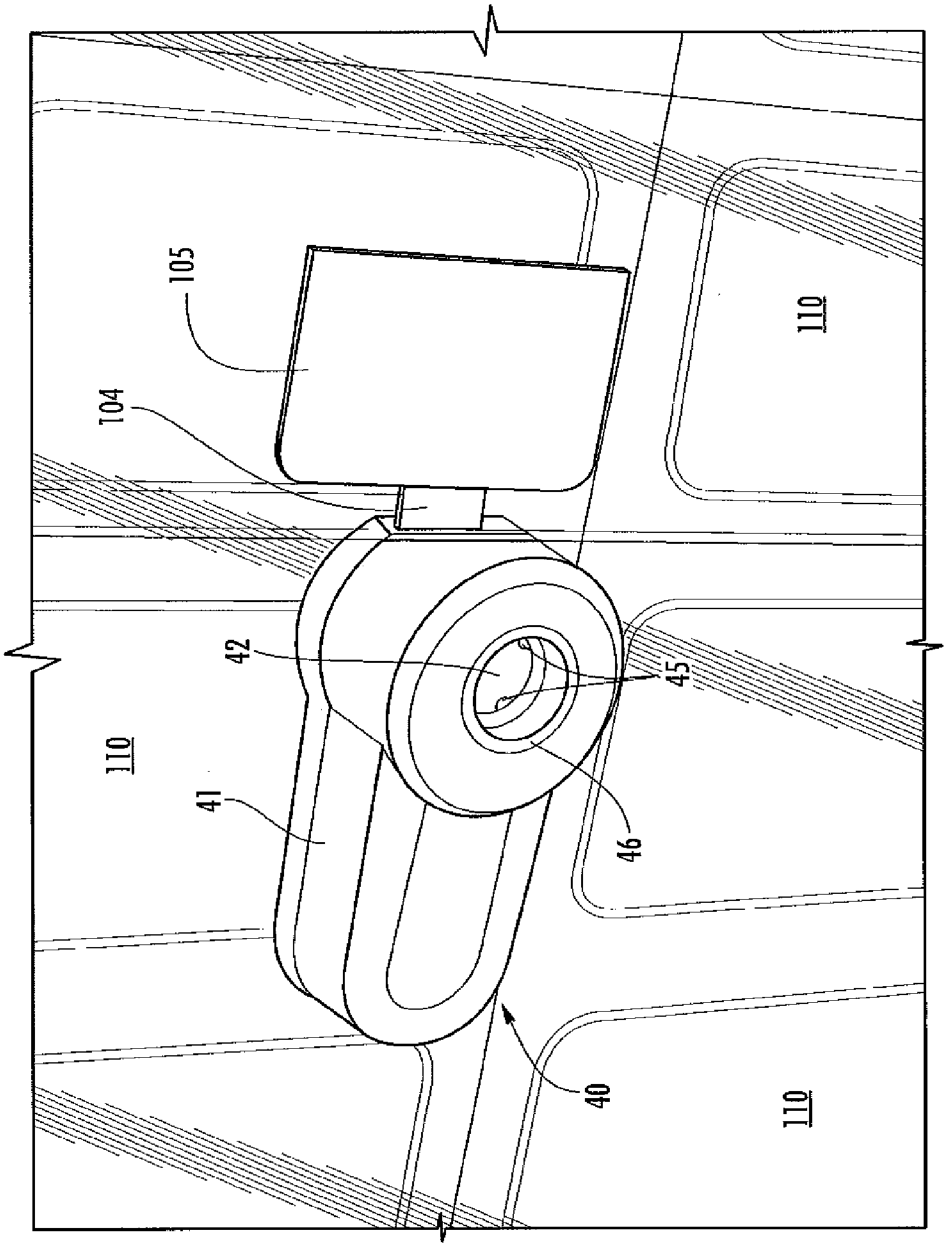
FIG. 4 is an enlarged view showing the merchandise security device of the system and method of FIG. 1A.
Figure 5:
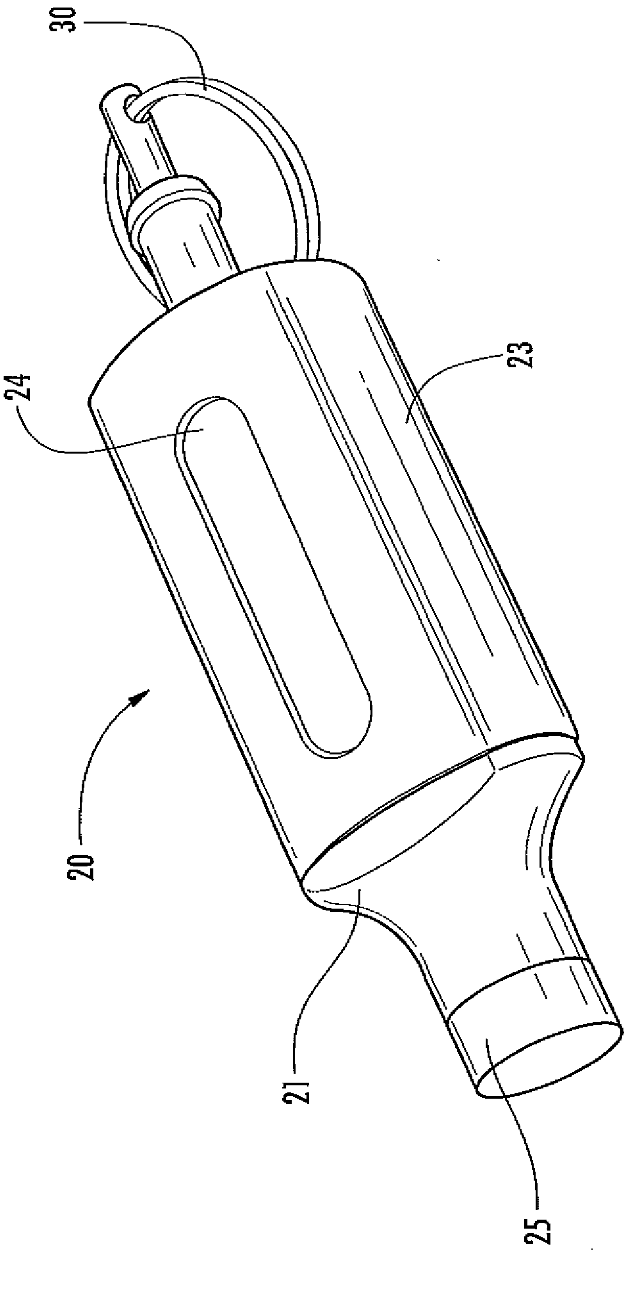
FIG. 5 is an enlarged view showing the programmable electronic key of the system and method of FIG. 1A in greater detail.

FIG. 4 is an enlarged view showing the exemplary embodiment of the merchandise security device 40 in greater detail. As previously mentioned, a merchandise security device 40 according to the present invention may be any type of security device including, but not limited to, a security display (e.g. alarming stand), security fixture (e.g. locking hook, shelf, cabinet, etc.), security packaging (e.g. merchandise keeper for items of merchandise) or a conventional door/window/drawer lock; etc., that utilizes electrical power to lock and/or unlock a mechanical lock mechanism, and optionally, further includes an electronic lock mechanism, such as an alarm or a security "handshake." At the same time, the merchandise security device 40 does not have an internal power source sufficient to operate the mechanical lock mechanism. As a result, the merchandise security device 40 is configured to receive at least power, and in one embodiment, both power and data from an external source, such as the merchandise security key 20 shown and described herein. The exemplary embodiment of the merchandise security device depicted in FIG. 4 is a cabinet lock 40 configured to be securely affixed to the locking arm 104 of a conventional cabinet lock bracket 105, as previously described. The cabinet lock 40 comprises a logic control circuit for performing a security handshake communication protocol with the logic control circuit of the merchandise security key 20 and for being programmed with the SDC by the key. In other embodiments, the cabinet lock 40 may be configured to transmit the SDC to the merchandise security key 20 to authenticate the security device and thereby authorize the key to transfer power to the cabinet lock. As previously mentioned, the data (e.g. handshake communication protocol and SDC) may be transferred (i.e. transmitted and received) by electrical contacts, optical transmission, acoustic transmission or magnetic induction, for example.

The cabinet lock 40 comprises a housing 41 sized and shaped to contain a logic control circuit (not shown) and an internal mechanical lock mechanism (not shown). A transfer port 42 formed in the housing 41 is sized and shaped to receive a transfer probe of the merchandise security key 20, as will be described. At least one, and sometimes, a plurality of magnets 45 may be disposed within the transfer port 42 for securely positioning and retaining the transfer probe of the key 20 in electrical contact with electrical contacts of the mechanical lock mechanism, and if desired, in electrical contact with the logic control circuit of the cabinet lock 40. In the exemplary embodiment shown and described in FIGS. 1A-9B, data is transferred from the merchandise security key 20 to the cabinet lock 40 by wireless communication, such as by infrared (IR) optical transmission, as shown and described in the commonly owned U.S. Pat. No. 7,737,843 entitled PROGRAMMABLE ALARM MODULE AND SYSTEM FOR PROTECTING MERCHANDISE, the disclosure of which is incorporated herein by reference in its entirety. Power is transferred from the merchandise security key 20 to the cabinet lock 40 through electrical contacts disposed on the transfer probe of the key and corresponding electrical contacts disposed within the transfer port 42 of the cabinet lock. For example, the transfer port 42 may comprise a metallic outer ring 46 that forms one electrical contact, while at least one of the magnets 45 form another electrical contact to complete an electrical circuit with the electrical contacts disposed on the transfer probe of the key 20. Regardless, electrical contacts transfer power from the key 20 to the mechanical lock mechanism disposed within the housing 41. As previously mentioned, the power transferred from the key 20 is used to operate the mechanical lock mechanism, for example utilizing an electric motor, DC stepper motor, solenoid, or the like, to unlock the mechanism so that the cabinet lock 40 can be removed from the locking arm 104 of the lock bracket 105.

FIGS. 5-8 show an exemplary embodiment of a merchandise security key, also referred to herein as a programmable electronic key, 20 according to the present invention. As previously mentioned, the merchandise security key 20 is configured to transfer both data and power to a merchandise security device 40 that comprises an electronic lock mechanism and a mechanical lock mechanism, as previously described. Accordingly, the programmable electronic key 20 may be an "active" device in the sense that it has an internal power source sufficient to operate the mechanical lock mechanism of the merchandise security device 40. As a result, the programmable electronic key 20 may be configured to transfer both data and power from an internal source disposed within the key, for example a logic control circuit (i.e. data) and a battery (i.e. power). The exemplary embodiment of the programmable electronic key 20 depicted in FIGS. 5-8 is a merchandise security key configured to be received within the transfer port 42 of the cabinet lock 40 shown in FIG. 4, as well as within the programming port 62 of the programming station 60 (FIG. 2; FIG. 3A) and the charging port 82 of the charging station 80 (FIG. 3B; FIG. 9A; FIG. 9B). The programmable electronic key 20 comprises a logic control circuit for performing a handshake communication protocol with the logic control circuit of the programming station 60 and for receiving the SDC from the programming station, as previously described. The logic control circuit of the programmable electronic key 20 further performs a handshake communication protocol with the logic control circuit of the merchandise security device 40 and transfers the SDC to the device or permits operation of the device, as previously described. As previously mentioned, the data (e.g. handshake communication protocol and SDC) may be transferred (e.g. transmitted and received) by direct electrical contacts, optical transmission, acoustic transmission or magnetic induction.

Figure 6:
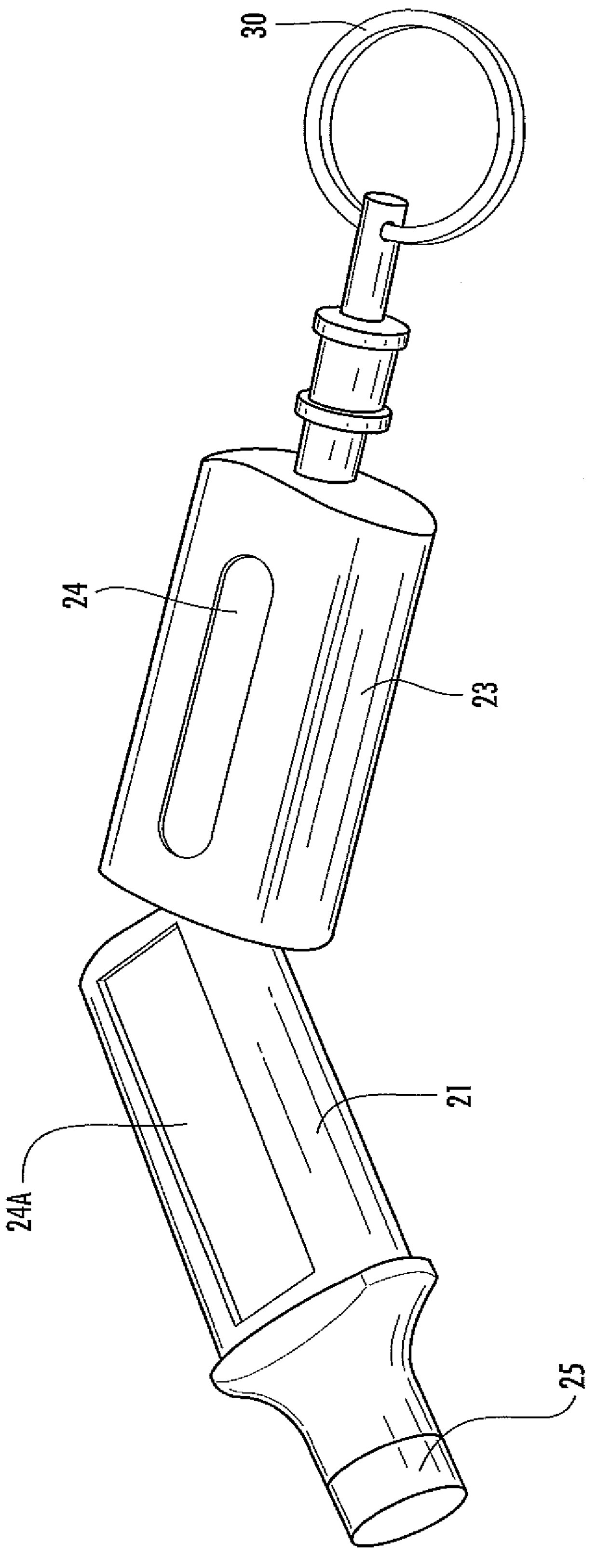
FIG. 6 is an exploded view of the programmable electronic key of FIG. 5.
Figure 7A:
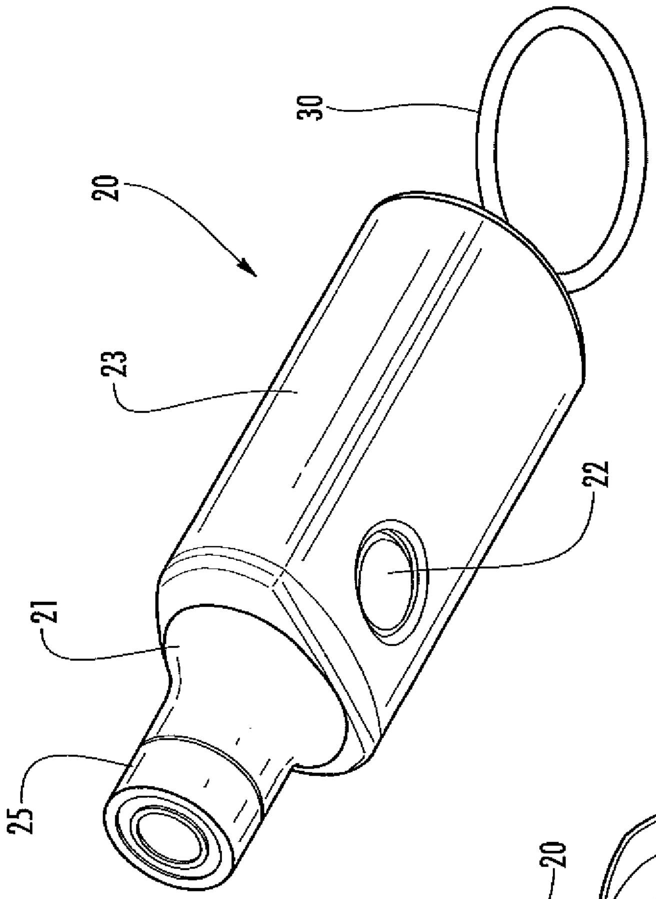
FIG. 7A is a perspective view of the programmable electronic key of FIG. 5.
Figure 7B:
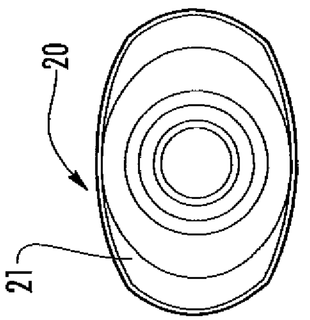
FIG. 7B is an end view of the programmable electronic key of FIG. 5.

As illustrated in FIG. 6, the programmable electronic key 20 comprises a housing 21 and an outer sleeve 23 that is removably disposed on the housing. The housing 21 contains the internal components of the key 20, including without limitation, the logic control circuit, memory, communication system and battery, as will be described. A window 24 may be formed through the outer sleeve 23 for viewing indicia 24A that uniquely identifies the key 20, or alternatively, indicates a particular item of merchandise, a specific merchandise security device, or a display area within a retail store for use with the key. The outer sleeve 23 is removably disposed on the housing 21 so that the indicia 24A may be altered or removed and replaced with different indicia. The programmable electronic key 20 may further comprise a detachable "quick-release" type key chain ring 30. An opening 26 (FIG. 8) is formed through the outer sleeve 23 and a key chain ring port 28 is formed in the housing 21 for receiving the key chain ring 30. The programmable electronic key 20 further comprises a transfer probe 25 located at an end of the housing 21 opposite the key chain ring port 28 for transferring data and power to the merchandise security device 40, as previously described. The transfer probe 25 also transmits and receives the handshake communication protocol and the SDC from the programming station 60, as previously described, and receives power from the charging station 80, as will be described in greater detail with reference to FIG. 9A and FIG. 9B.

Figure 8:
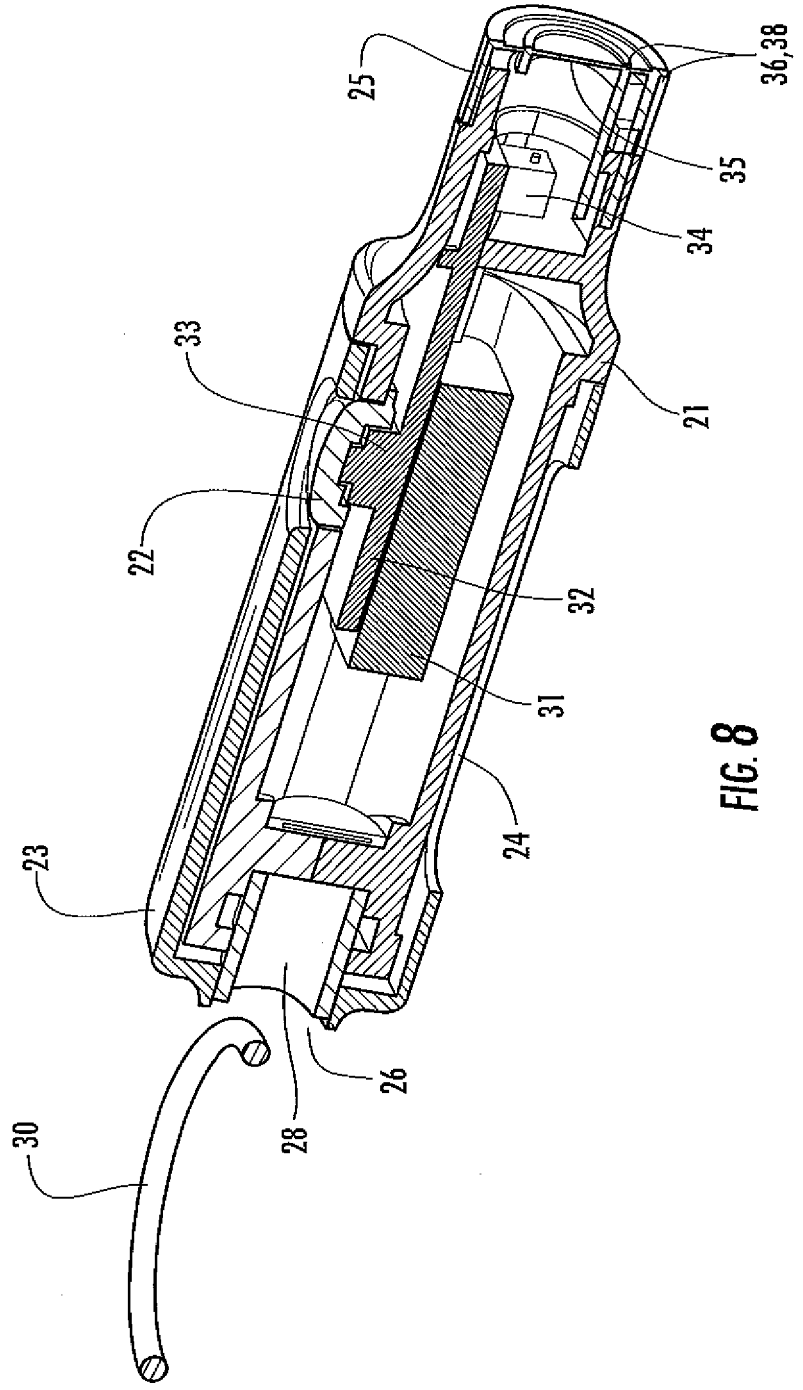
FIG. 8 is a perspective view showing a lengthwise cross-section of the programmable electronic key of FIG. 5.
Figure 9B:
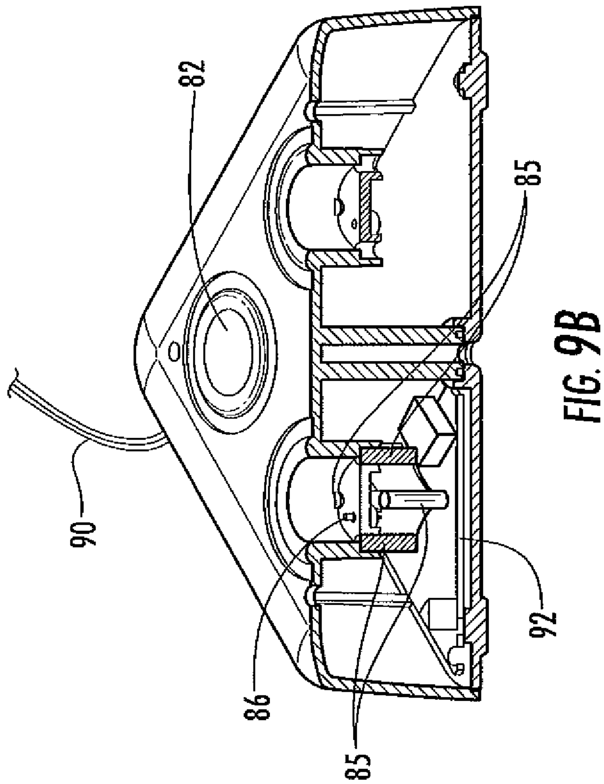
FIG. 9B is a perspective view showing a diagonal cross-section of the charging station of FIG. 9A taken along the line 9B-9B.
Figure 9A:
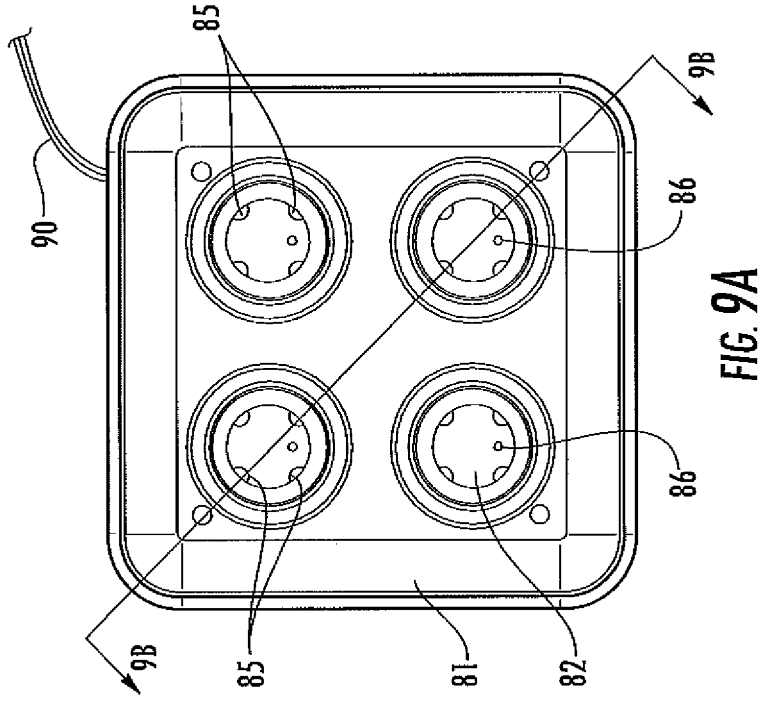
FIG. 9A is a top view showing the charging station of the system and method of FIG. 1A.
Figure 10:
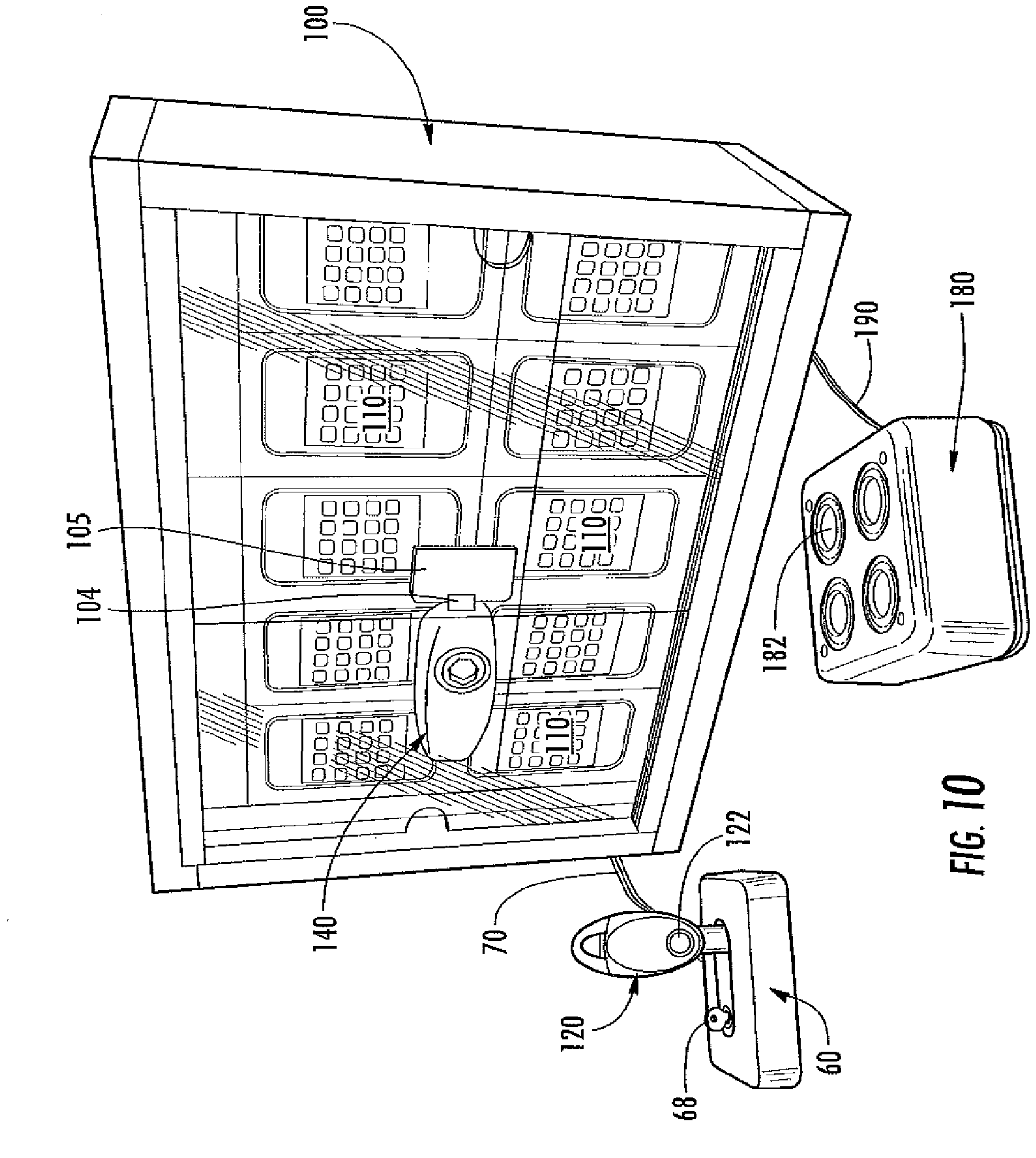
FIG. 10 shows another embodiment of a merchandise display security system and method including a programmable electronic key, a merchandise security device, a programming station and a charging station according to the invention.

As best shown in FIG. 8, an internal battery 31 and a logic control circuit or printed circuit board (PCB) 32 are disposed within the housing 21 of the programmable electronic key 20. Battery 31 may be a conventional extended-life replaceable battery or a rechargeable battery suitable for use with the charging station 80. The logic control circuit 32 is operatively coupled and electrically connected to a switch 33 that is actuated by the control button 22 provided on the exterior of the key 20 through the outer sleeve 23. Control button 22 in conjunction with switch 33 controls certain operations of the logic control circuit 32, and in particular, transmission of the data (i.e. handshake communication protocol and SDC) to the merchandise security device 40. In that regard, the logic control circuit 32 is further operatively coupled and electrically connected to a communication system 34 for transmitting and receiving the handshake communication protocol and SDC data. In the exemplary embodiment shown and described herein, the communication system 34 is a wireless infrared (IR) transceiver for optical transmission of data between the programmable electronic key 20 and the programming station 60, as well as between the key 20 and the merchandise security device 40. As a result, the transfer probe 25 of the key 20 is provided with an optically transparent or translucent filter window 35 for emitting and collecting optical transmissions between the key 20 and the programming station 60, or alternatively, between the key 20 and the merchandise security device 40, as required. Transfer probe 25 further comprises at least one bi-directional power transfer electrical contacts 36, 38 made of an electrically conductive material for transferring power to the merchandise security device 40 and for receiving power from the charging station 80, as required. Accordingly, electrical contacts 36, 38 are electrically connected to battery 31, and are operatively coupled and electrically connected to logic control circuit 32 in any suitable manner, for example by conductive insulated wires or plated conductors.

According to one aspect of a programmable electronic key 20 according to the present invention, especially when used for use in conjunction with a merchandise security device 40 as described herein, the key does not require a physical force to be exerted by a user on the key to operate the mechanical lock mechanism of the merchandise security device. By extension, no physical force is exerted by the key on the mechanical lock mechanism. As a result, the key cannot be unintentionally broken off in the lock, as often occurs with conventional mechanical key and lock mechanisms. Furthermore, neither the key nor and the mechanical lock mechanism suffer from excessive wear as likewise often occurs with conventional mechanical key and lock mechanisms. In addition, there is no required orientation of the transfer probe 25 of the programmable electronic key 20 relative to the charging port 82 of the charging station 80 or the transfer port 42 of the merchandise security device 40. Accordingly, any wear of the electrical contacts on the transfer probe 25, the charging port 82 or the transfer port 42 is minimized. As a further advantage, an authorized person is not required to position the transfer probe 25 of the programmable electronic key 20 in a particular orientation relative to the transfer port 42 of the merchandise security device 40 and thereafter exert a compressive and/or torsional force on the key to operate the mechanical lock mechanism of the device.

FIG. 9A and FIG. 9B show charging station 80 in greater detail. As previously mentioned, the charging station 80 recharges the internal battery 31 of the programmable electronic key 20, and if desired, deactivates the data transfer and/or power transfer capability of the key until the key is reprogrammed with the SDC by the programming station 60. Regardless, the charging station 80 comprises a housing 81 for containing the internal components of the charging station. The exterior of the housing 81 has at least one, and preferably, a plurality of charging ports 82 formed therein that are sized and shaped to receive the transfer probe 25 of the merchandise security key 20, as previously described. At least one, and in some embodiment a plurality, of magnets 85 are disposed within each charging port 82 for securely positioning and retaining the transfer probe 25 in electrical contact with the charging station 80. More particularly, the electrical contacts 36, 38 of the key 20 are retained within the charging port 82 in electrical contact with the magnets 85 and a resilient "pogo" pin 86 made of a conductive material to complete an electrical circuit between the charging station 80 and the battery 31 of the key.

As best shown in FIG. 9B, housing 81 is sized and shaped to contain a logic control circuit, or printed circuit board (PCB) 92 that is operatively coupled and electrically connected to the magnets 85 and the pogo pin 86 of each charging port 82. The pogo pin 86 is depressible to complete an electrical circuit as the magnets 85 position and retain the electrical contacts 36, 38 within the charging port 82. In particular, magnets 85 make electrical contact with the outer ring electrical contact 36 of the transfer probe 25 of key 20, while pogo pin 86 makes electrical contact with inner ring electrical contact 38 of the transfer probe. When the pogo pin 86 is depressed and the electrical circuit between the charging station 80 and the key 20 is completed, the charging station recharges the internal battery 31 of the key. As previously mentioned, charging station 80 may comprise an internal power source, for example, an extended-life replaceable battery or a rechargeable battery, for providing power to the key(s) 20 positioned within the charging port(s) 82. Alternatively, and as shown herein, the logic control circuit 92 of the charging station 80 is electrically connected to an external power source by a power cord 90 having at least one conductor. Furthermore, logic control circuit 92 may be operable for deactivating the data transfer and power transfer functions of the programmable electronic key 20, or alternatively, for activating the "time-out" feature of the key until it is reprogrammed or refreshed by the programming station 60.

FIGS. 10-17B show another exemplary embodiment of a merchandise display security system and method including a programmable key, a merchandise security device, a programming station and a charging station according to the present invention. In this embodiment, the system and method comprise at least a programmable electronic key (also referred to herein as a merchandise security key) with inductive transfer, indicated generally at 120, and a merchandise security device with inductive transfer, indicated generally at 140, that is operated by the key 120. However, the programmable electronic key 120 is useable with any security device or locking device with inductive transfer capability that requires power transferred from the key to the device by induction, or alternatively, requires data transferred between the key and the device and power transferred from the key to the device by induction. Further examples include, but are not limited to, a door lock, a drawer lock or a shelf lock, as well as any device that prevents an unauthorized person from accessing, removing or detaching an item from a secure location or position.

The system and method may further comprise an optional programming station 60, as previously described, operable for programming the key 120 with a Security Disarm Code (SDC). In addition to programming station 60, the system and method may further comprise an optional charging station with inductive transfer, indicated generally at 180, operable for initially charging and subsequently recharging an internal power source disposed within the key 120.

As previously described with respect to programmable electronic key 20, the programmable electronic key 120 is configured to be programmed with a unique SDC by the programming station 60. Data communication between the programming station 60 and the key 120 may be accomplished directly, for example by one or more electrical contacts, or indirectly, for example by wireless communication. Any form of wireless communication capable of transferring data between the programming station 60 and key 120 is possible, including without limitation, optical transmission, acoustic transmission, radio frequency (RF) transmission or inductive transmission, such as magnetic induction. In the embodiments shown and described herein, communication between programming station 60 and key 120 is accomplished by wireless optical transmission, and more particularly, by infrared (IR) transceivers provided in the programming station and the key.

Figure 11:
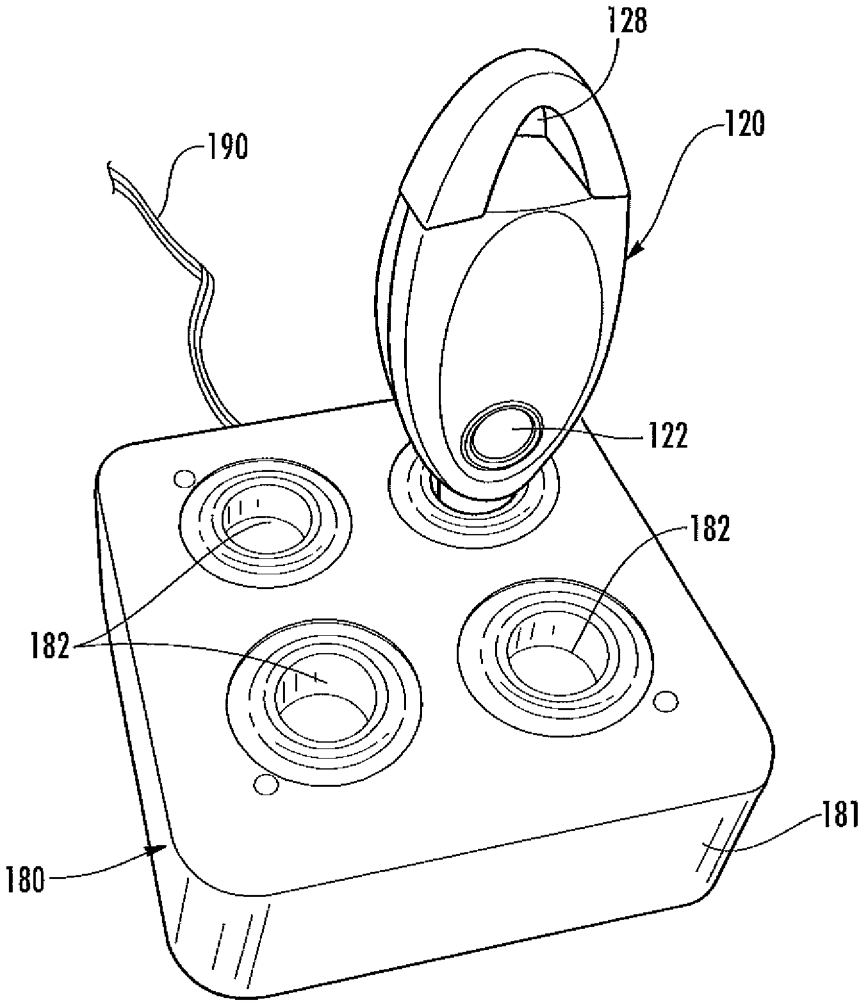
FIG. 11 is an enlarged view showing the programmable electronic key of FIG. 10 positioned on the charging station of FIG. 10 to recharge a power source disposed within the key.

As illustrated in FIG. 11, the merchandise security system and method further comprises charging station 180 for initially charging and subsequently recharging a rechargeable battery disposed within the merchandise security key 120 via inductive transfer. The charging station 180 comprises at least one, and preferably, a plurality of charging ports 182 each sized and shaped to receive a merchandise security key 120. If desired, each charging port 182 may comprise mechanical or magnetic means for properly positioning and securely retaining the key 120 within the charging port. By way of example and without limitation, at least one, and sometimes a plurality of magnets (not shown), may be provided for positioning and retaining the key 120 within the charging port 182 of the charging station 180. However, as will be described further with reference to FIG. 17B, it is only necessary that the inductive transceiver of the merchandise security key 120 is sufficiently aligned with the corresponding inductive transceiver of the charging station 180 over a generally planar surface within the charging port 182. Thus, magnets are not required (as with charging station 80) to position, retain and maintain electrical contacts provided on the merchandise security key 120 in electrical contact with corresponding electrical contacts provided on the charging station 180. If desired, the charging station 180 may comprise an internal power source, for example, an extended-life replaceable battery or a rechargeable battery, for providing power to the key(s) 120 positioned within the charging port(s) 182. Alternatively, and as shown herein, charging station 180 may be operatively connected to an external power source by a power cord 190 having at least one conductor in a conventional manner.

Figure 12:
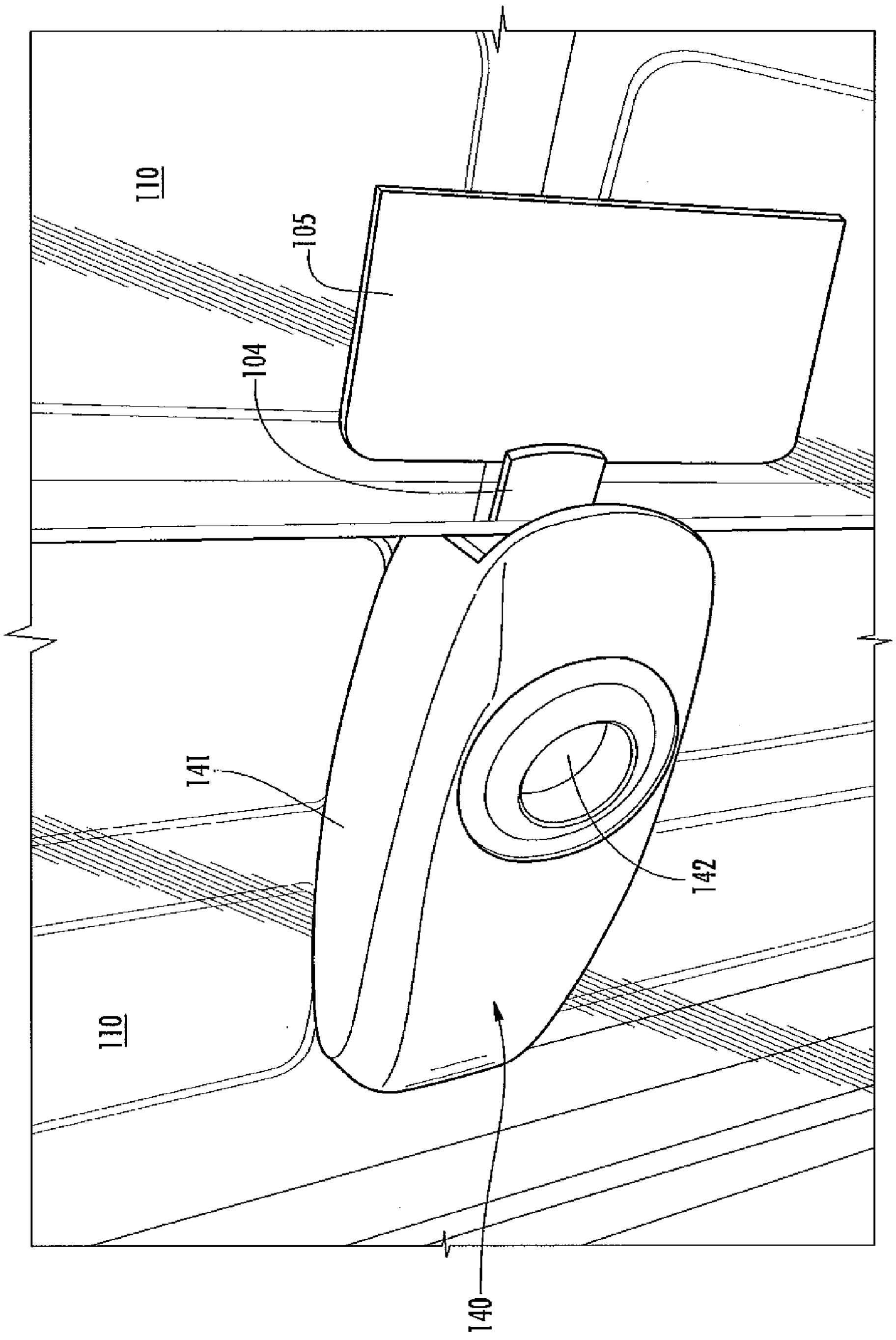
FIG. 12 is an enlarged view showing the merchandise security device of the system and method of FIG. 10.
Figure 13:
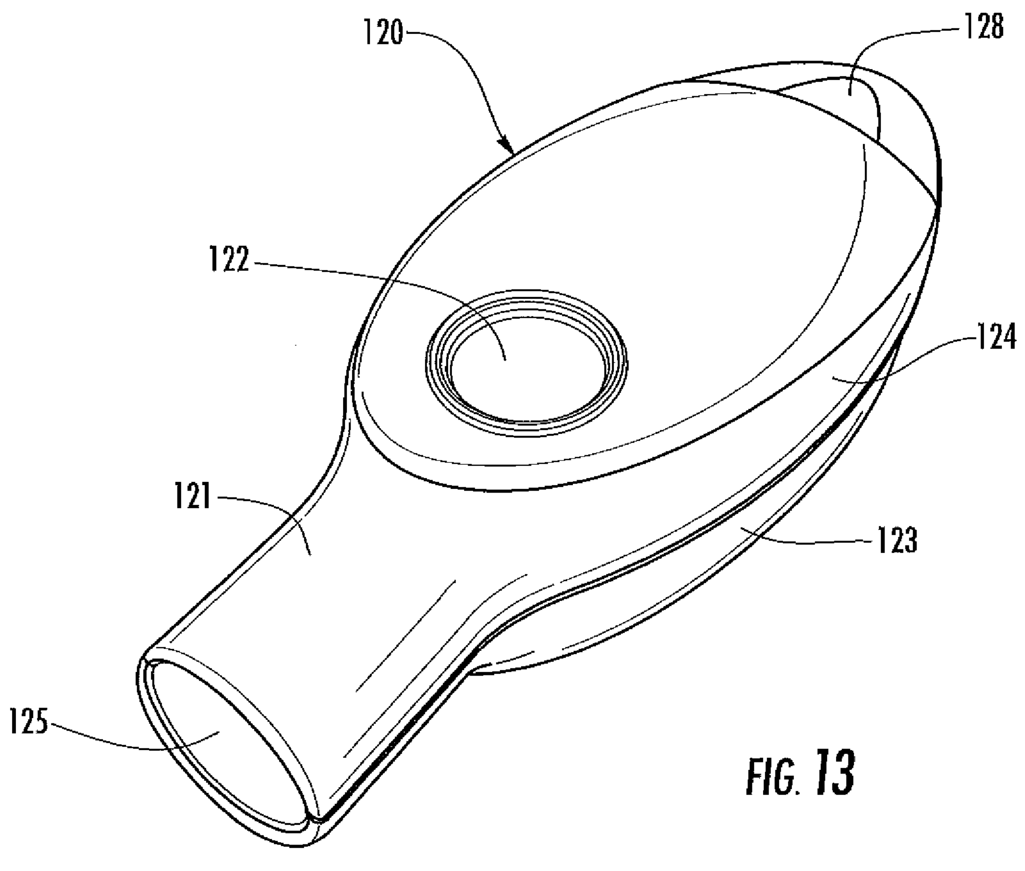
FIG. 13 is an enlarged view showing the programmable electronic key of the system and method of FIG. 10 in greater detail.

FIG. 12 shows the merchandise security device 140 (e.g., cabinet lock) with inductive transfer in greater detail. The embodiment of the merchandise security device depicted in FIG. 12 is a cabinet lock configured to be securely affixed to the locking arm 104 of a conventional cabinet lock bracket 105. As previously described, the cabinet lock 140 comprises a logic control circuit for performing a handshake communication protocol with the logic control circuit of the merchandise security key 120 and for receiving the SDC from the key. In other embodiments, the cabinet lock 140 may be configured to transmit the SDC to the merchandise security key 120 to authenticate the security device and thereby authorize the key to transfer power to the security device. As previously mentioned, the data (e.g. handshake communication protocol and SDC) may be transmitted and received (e.g. transferred) by electrical contacts, optical transmission, acoustic transmission, radio frequency (RF) transmission or magnetic induction. In a particular embodiment, a merchandise security device 140 with inductive transfer according to the invention may both receive electrical power from the merchandise security key 120 and communicate (i.e. transmit/receive) the SDC with the key by magnetic induction.

The cabinet lock 140 comprises a housing 141 sized and shaped to contain a logic control circuit (not shown) and an internal mechanical lock mechanism (not shown). A transfer port 142 formed in the housing 141 is sized and shaped to receive a transfer probe of the merchandise security key 120, as will be described. If desired, the transfer port 142 may comprise mechanical or magnetic means for properly positioning and securely retaining the key 120 within the transfer port. By way of example and without limitation, at least one, and sometimes a plurality of, magnets (not shown) may be provided for positioning and retaining the key 120 within the transfer port 142 of the cabinet lock 140. However, as previously described with respect to the merchandise security key 120 and the charging port 182 of the charging station 180, it is only necessary that the inductive transceiver of the merchandise security key 120 is sufficiently aligned with the corresponding inductive transceiver of the cabinet lock 140 over a generally planar surface within the transfer port 42. Therefore, magnets are not required to position, retain and/or maintain electrical contacts provided on the merchandise security key 120 in electrical contact with corresponding electrical contacts provided on the cabinet lock 140. In the particular embodiment shown and described herein, data and/or power is transferred from the merchandise security key 120 to the cabinet lock 140 by wireless communication, such as infrared (IR) optical transmission as discussed above. Power is transferred from the merchandise security key 120 to the cabinet lock 140 by induction across the transfer port 142 of the cabinet lock using an inductive transceiver disposed within a transfer probe of the key that is aligned with a corresponding inductive transceiver disposed within the cabinet lock. For example, the transfer probe of the merchandise security key 120 may comprise an inductive transceiver coil that is electrically connected to the logic control circuit of the key to provide electrical power from the internal battery of the key to an inductive transceiver coil disposed within the cabinet lock 140. The inductive transceiver coil of the cabinet lock 140 then transfers the electrical power from the internal battery of the key 120 to the mechanical lock mechanism disposed within the housing 141 of the cabinet lock. As previously mentioned, the power transferred from the key 120 is used to unlock the mechanical lock mechanism, for example utilizing an electric motor, DC stepper motor, solenoid, or the like, so that the cabinet lock 140 can be removed from the arm 104 of the lock bracket 105.

FIGS. 13-16 show the programmable electronic key 120 with inductive transfer in greater detail. As previously mentioned, the key 120 is configured to transfer both data and power to a merchandise security device 140 that comprises an electronic lock mechanism and a mechanical lock mechanism. Accordingly, the programmable electronic key 120 may be an active device in the sense that it has an internal power source sufficient to operate the mechanical lock mechanism of the merchandise security device 140. As a result, the programmable electronic key 120 may be configured to transfer both data and power from an internal source, such as a logic control circuit (i.e. data) and a battery (i.e. power) disposed within the key. The embodiment of the programmable electronic key 120 depicted herein is a merchandise security key with inductive transfer capability configured to be received within the transfer port 145 of the cabinet lock 140 shown in FIG. 12, as well as the programming port 62 of the programming station 60 (FIG. 2) and the charging port 182 of the charging station 180 (FIG. 11). The programmable electronic key 120 comprises a logic control circuit for performing a handshake communication protocol with the logic control circuit of the programming station 60 and for receiving the SDC from the programming station, as previously described. The logic control circuit of the programmable electronic key 120 further performs a handshake communication protocol with the logic control circuit of the merchandise security device 140 and transfers the SDC to the merchandise security device, as previously described. As previously mentioned, the data (e.g. handshake communication protocol and SDC) may be transferred (i.e. transmitted and received) by electrical contacts, optical transmission, acoustic transmission, radio frequency (RF) or magnetic induction. In a particular embodiment, a merchandise security key 120 with inductive transfer according to the invention may both transfer electrical power to a merchandise security device 140 and communicate (e.g. transmit/receive) the SDC with the security device by magnetic induction.

The programmable electronic key 120 comprises a housing 121 having an internal cavity or compartment that contains the internal components of the key, including without limitation the logic control circuit, memory, communication system and battery, as will be described. Although various sizes and shapes may be employed, the housing 121 is illustrated as having a lower portion 123 and an upper portion 124 that are joined together after assembly, for example, by ultrasonic welding. The programmable electronic key 120 further defines an opening 128 at one end for coupling the key to a key chain ring, lanyard or the like. As previously mentioned, the programmable electronic key 120 further comprises a transfer probe 125 located at an end of the housing 121 opposite the opening 128 for transferring data and power to the merchandise security device 140. The transfer probe 125 is also operable to transmit and receive the handshake communication protocol and the SDC from the programming station 60, as previously described, and to receive power from the charging station 180, as will be described in greater detail with reference to FIG. 17A and FIG. 17B.

Figure 14:
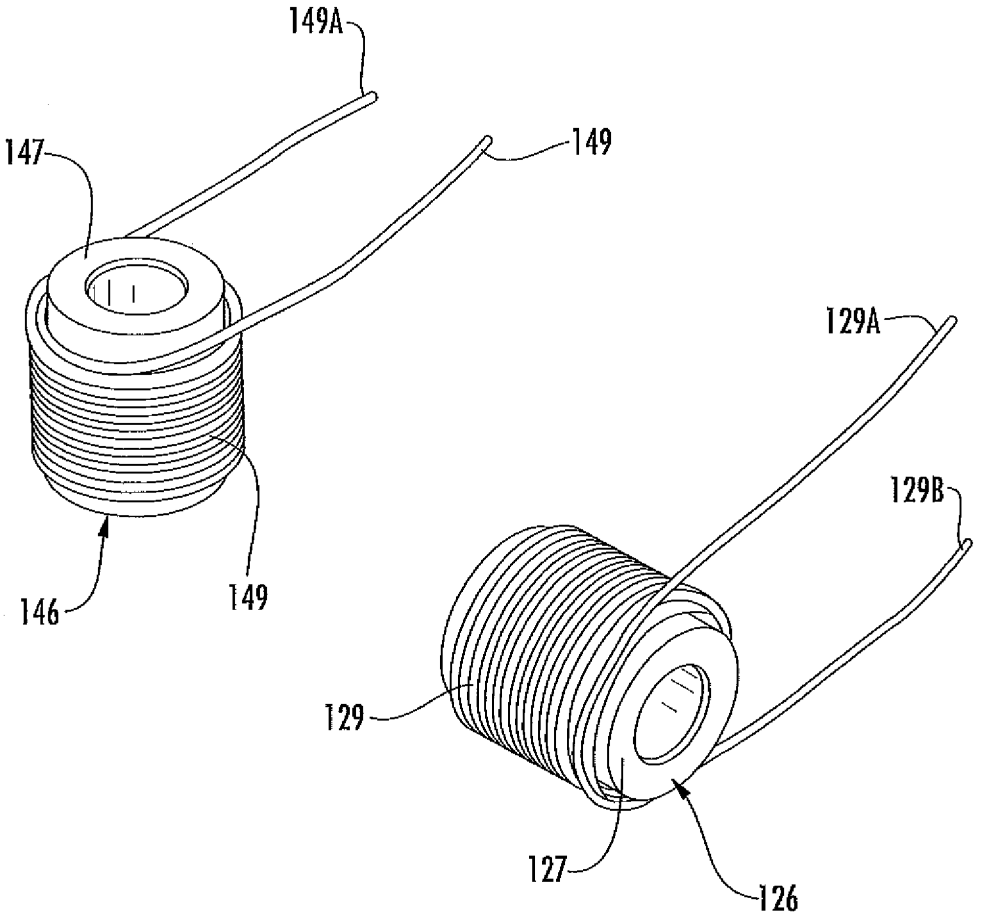
FIG. 14 is a perspective view showing a pair of matched coils for use with the programmable electronic key and the merchandise security device of FIG. 10.
Figure 15B:
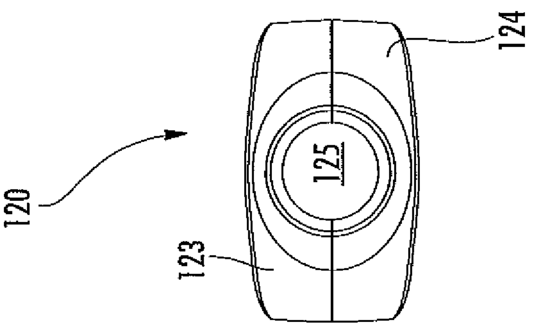
FIG. 15B is an end view of the programmable electronic key of FIG. 13.
Figure 15A:
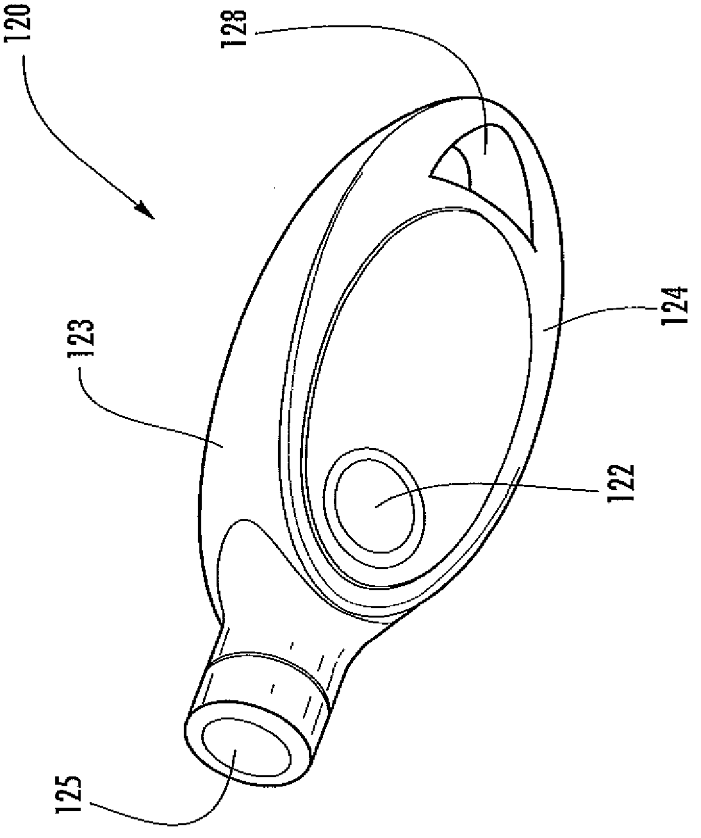
FIG. 15A is a perspective view of the programmable electronic key of FIG. 13.

FIG. 14 shows an exemplary embodiment of an inductive coil 126 having high magnetic permeability that is adapted (i.e. sized and shaped) to be disposed within the housing 121 of the electronic key 120 adjacent the transfer probe 125. As shown herein, the inductive coil 126 comprises a highly magnetically permeable ferrite core 127 surrounded by a plurality of inductive core windings 129. The inductive core windings 129 consist of a length of a conductive wire that is wrapped around the ferrite core. Passing an alternating current through the conductive wire generates, or induces, a magnetic field around the inductive core 127. The alternating current in the inductive core windings 129 may be produced by connecting the leads 129A and 129B of the conductive wire to the internal battery of the electronic key 120 through the logic control circuit. FIG. 14 further shows an inductive coil 146 having high magnetic permeability that is adapted (i.e. sized and shaped) to be disposed within the housing 141 of the merchandise security device (i.e. cabinet lock) 140 adjacent the transfer port 142. As shown herein, the inductive coil 146 comprises a highly magnetically permeable ferrite core 147 surrounded by a plurality of inductive core windings 149 consisting of a length of a conductive wire that is wrapped around the ferrite core. Placing the transfer probe 125 of the electronic key 120 into the transfer port 142 of the cabinet lock 140 and passing an alternating current through the inductive core windings 129 of the inductive core 126 generates a magnetic field within the transfer port of the cabinet lock in the vicinity of the inductive coil 146. As a result, an alternating current is generated, or induced, in the conductive wire of the inductive core windings 149 of inductive coil 146 having leads 149A and 149B connected to the logic control circuit of the cabinet lock 140. The alternating current induced in the inductive coil 146 of the cabinet lock 140 is then transformed into a direct current, such as via a bridge rectifier on the logic control circuit, to provide direct current (DC) power to the cabinet lock. The DC power generated in the cabinet lock 140 by the inductive coil 126 of the electronic key 120, may be used, for example, to unlock a mechanical lock mechanism disposed within the housing 141 of the cabinet lock.

Figure 16:
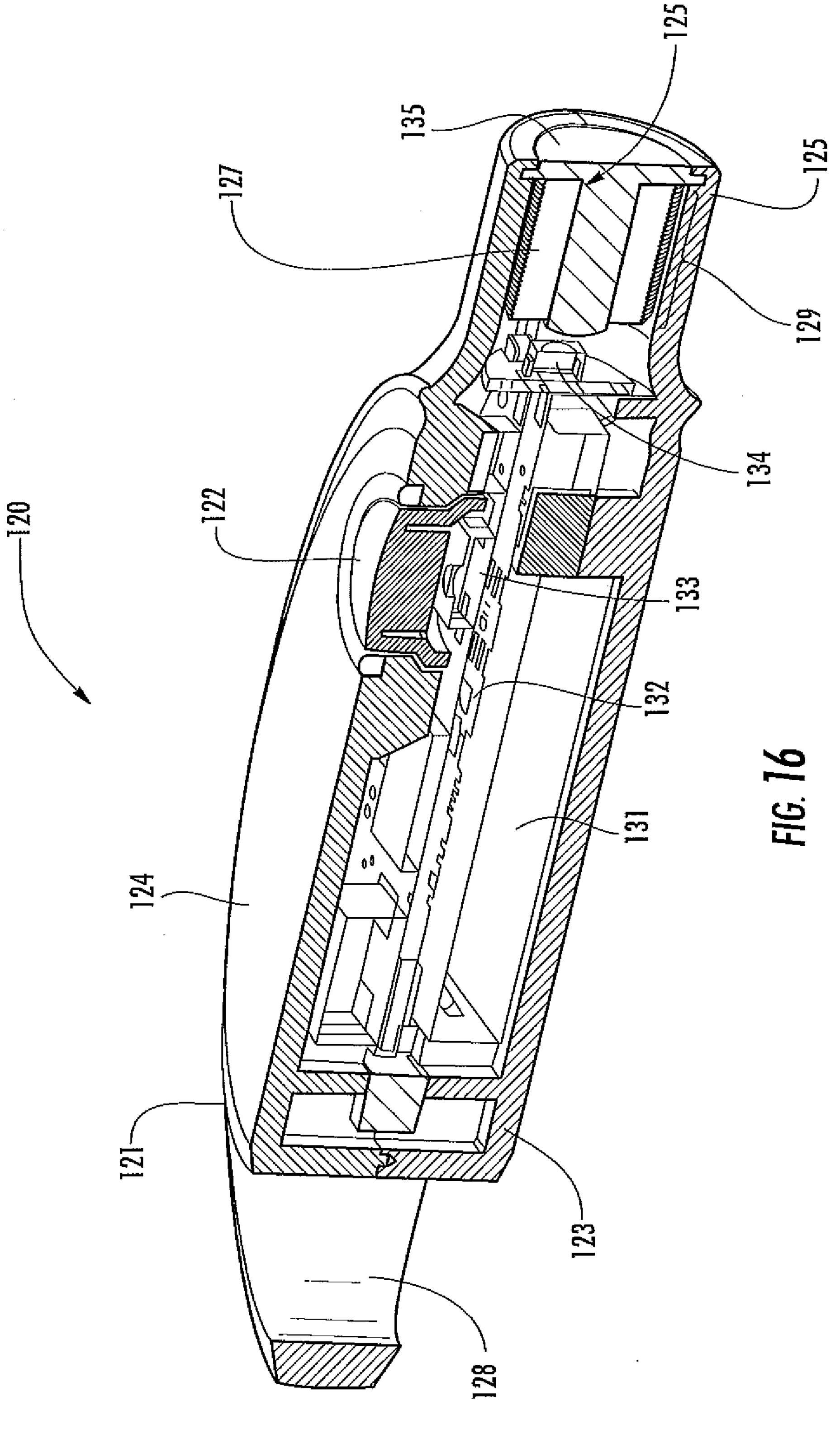
FIG. 16 is a perspective view showing a lengthwise cross-section of the programmable electronic key of FIG. 13.

As best shown in FIG. 16, an internal battery 131 and a logic control circuit, or printed circuit board (PCB) 132 are disposed within the housing 121 of the programmable electronic key 120. Battery 131 may be a conventional extended-life replaceable battery, or a rechargeable battery suitable for use with the charging station 180. The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of the data (i.e. handshake communication protocol and SDC) between the key and the programming station 60, as well as between the key and the merchandise security device 140. In that regard, the logic control circuit 132 is further operatively coupled and electrically connected to a communication system 134 for transferring the handshake communication protocol and SDC data. As shown and described herein, the communication system 134 is a wireless infrared (IR) transceiver for optical transmission of data between the programmable electronic key 120 and the programming station 60, and between the key and the merchandise security device 140. As a result, the transfer probe 125 of the key 120 is provided with an optically transparent or translucent filter window 135 for emitting and collecting optical transmissions between the key 120 and the programming station 60, or between the key and the merchandise security device 140, as required. Transfer probe 125 further comprises inductive coil 126 (FIG. 14) comprising inductive core 127 and inductive core windings 129 for transferring electrical power to the merchandise security device 140 and/or receiving electrical power from the charging station 180 to charge the internal battery 131, as required. Accordingly, the leads 129A and 129B (FIG. 14) of the inductive coil 126 are electrically connected to the logic control circuit 132, which in turn is electrically connected to the battery 131, in a suitable manner, for example by conductive insulated wires or plated conductors. Alternatively, the optical transceiver 134 may be eliminated and data transferred between the programmable electronic key 120 and the merchandise security device 140 via magnetic induction through the inductive coil 126.

Figure 17B:
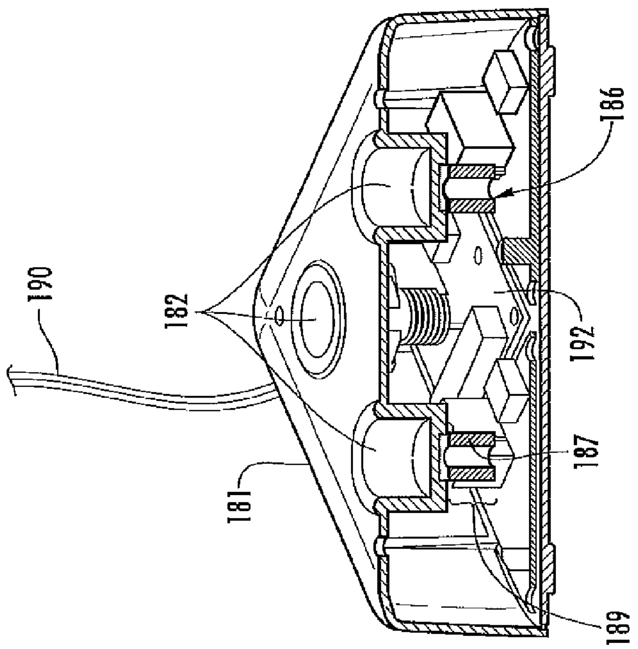
FIG. 17B is a perspective view showing a diagonal cross-section of the charging station of FIG. 17A taken along the line 17B-17B.
Figure 17A:
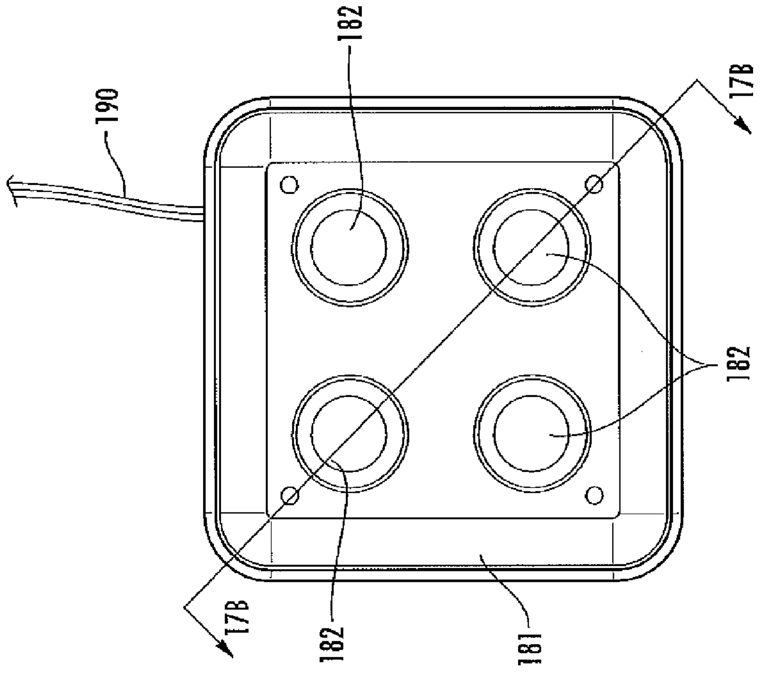
FIG. 17A is a top view showing the charging station of the system and method of FIG. 10.

FIG. 17A and FIG. 17B show charging station 180 with inductive transfer capability in greater detail. As previously mentioned, the charging station 180 recharges the internal battery 131 of the merchandise security key 120. In certain instances, the charging station 180 also deactivates the data transfer and/or power transfer capability of the key 120 until the key has been reprogrammed with the SDC by the programming station 60. Regardless, the charging station 180 comprises a housing 181 for containing the internal components of the charging station. The exterior of the housing 181 has at least one charging port 182 formed therein that is sized and shaped to receive the transfer probe 125 of a programmable electronic key 120. As previously described, mechanical or magnetic means may be provided for properly positioning and securely retaining the transfer probe 125 within the charging port 182 such that the inductive coil 126 is in alignment with a corresponding inductive coil 186 (FIG. 17B) disposed within the housing 181 of the charging station 180 adjacent the charging port. As will be readily understood and appreciated, the inductive coil 186 adjacent the charging port 182 of the charging station 180 generates, or induces, an alternating current in the conductive wire of the inductive core windings 129 of inductive coil 126 that in turn provides DC power (for example, via a bridge rectifier on the logic control circuit 132) to charge the battery 131 of the programmable electronic key 120.

As best shown in FIG. 17B, housing 181 is sized and shaped to contain a logic control circuit or printed circuit board (PCB) 192 that is electrically connected and operatively coupled to an inductive coil 186 adjacent each of the charging ports 182. In the manner previously described with respect to inductive coli 126 and inductive coil 146, each inductive coil 186 comprises an inductive core 187 surrounded by a plurality of inductive core windings 189 formed by a conductive wire having a pair of leads (not shown). When an alternating current is passed through the conductive wire of the inductive core windings 189 with the transfer probe 125 of the programmable electronic key 120 disposed in the charging port 182 of the charging station 180, the inductive coil 186 generates a magnetic field that induces an alternating current in the conductive wire of the inductive core windings 129 of the inductive coil 126 of the key. The alternating current in the inductive coil 126 is then transformed into DC power to charge the internal battery 131 of the programmable electronic key 120. As previously mentioned, charging station 180 may comprise an internal power source, for example, an extended-life replaceable battery or a rechargeable battery, for providing power to the key(s) 120 positioned within the charging port(s) 182. Alternatively, and as shown herein, the logic control circuit 192 of the charging station 180 is electrically connected to an external power source by a power cord 190 having at least one conductor. Furthermore, logic control circuit 192 may be operable for deactivating the data transfer and/or power transfer functions of the programmable electronic key 120, or alternatively, for activating the "timing out" feature of the key until it is reprogrammed or refreshed by the programming station 60.

According to one embodiment, electronic key 20, 120 includes at least one audio indicator for indicating the status of a lock that is operated by the key. In this regard, lock or locking device may be associated with a merchandise security device, such as cabinet locks 40, 140, including a locking mechanism discussed above.

Figure 18:
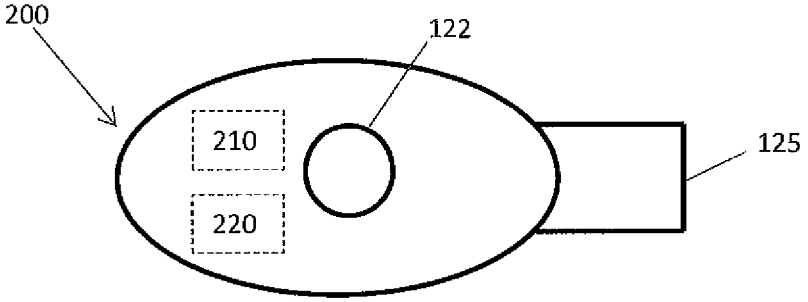
FIG. 18 is a top view of another embodiment of an electronic key.

In one embodiment, FIG. 18 shows an electronic key 200 comprising a logic control circuit or electronic circuitry 210 (e.g. a controller disposed on a PCB) and an audio component 220 (e.g. a piezo or piezoelectric alarm) that produces and emits an audio signal when the key successfully unlocks or locks the cabinet lock. As discussed above, the electronic key may be configured to transmit a communications protocol signal, also known as a "handshake" (e.g. a security code), to the cabinet lock and receive a corresponding signal back from the cabinet lock authorizing the electronic key to transfer power to the lock mechanism of the lock to change the status of the lock from a locked state to an unlocked state, or alternatively, from an unlocked state to a locked state. When the lock mechanism operates to change the state of the lock from a locked state to an unlocked state, the lock transmits a signal to the electronic key indicating that a successful change of state (e.g. from locked to unlocked) has occurred.

Figure 19:
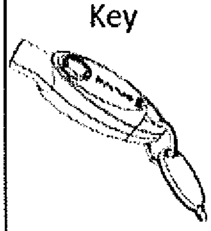
FIGS. 19 and 20 are state diagrams depicting "Desired Lock" and "Desired Relock" experiences according to embodiments of the present invention.
Figure 19:
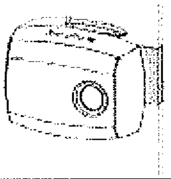
Figure 19:
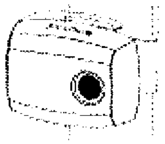
Figure 19:
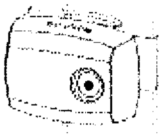
Figure 19:
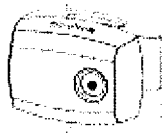
Figure 20:
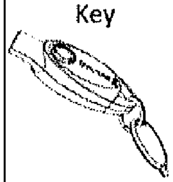
Figure 20:
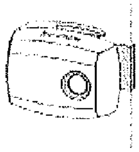
Figure 20:
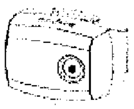
Figure 20:
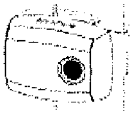
Figure 20:
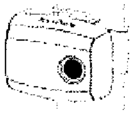
Figure 20:
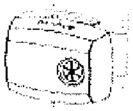
Figure 20:
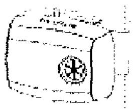

In an embodiment illustrated in FIGS. 19 and 20, state diagrams of a "Desired Unlock" experience and a "Desired Relock" experience are shown, respectively. In this embodiment, the electronic circuitry 210 of the key 200 activates the audio component to emit an initial audio indication, for example, a single "Beep" to indicate to a user that the state of the lock has successfully changed from locked to unlocked. Thereafter, the audio component 220 is activated to emit a first audio indication, for example a "BeepBeep", to indicate to a user that the lock in is an unlocked (unsecured) state. The first audio indication may be emitted continuously or intermittently until the key 200 again transfers power to the lock and the lock successfully operates to change the state of the lock from the unlocked (unsecured) state back to the locked (secured) state. Alternatively, the first audio indication may be emitted continuously or intermittently for only a predetermined period of time (e.g., about 120 seconds) unless the state of the lock is changed from the unlocked (unsecured) state back to the locked (secured) state within the predetermined time period.

Figure 21:
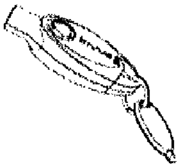
FIGS. 21 and 22 are state diagrams depicting "Undesired Unlock" and "Undesired Relock" experiences according to embodiments of the present invention.
Figure 21:
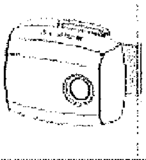
Figure 21:
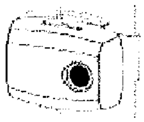
Figure 21:
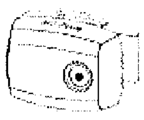
Figure 21:
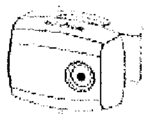
Figure 22:
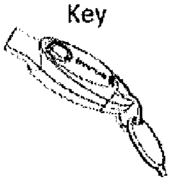
Figure 22:
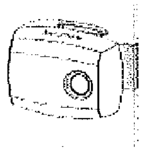
Figure 22:
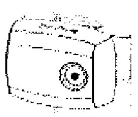
Figure 22:
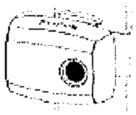
Figure 22:
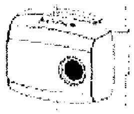
Figure 22:
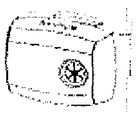
Figure 22:
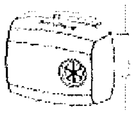

In another embodiment illustrated in FIGS. 21 and 22, an "Impatient (undesired) Unlock" experience and an "Impatient (undesired) Relock" experience are shown, respectively. In this embodiment, the electronic key 200 includes electronic circuitry 210 and an audio component 220 (e.g. a piezo or piezoelectric alarm) that produces and emits an audio signal when the key does not successfully change the status of a lock or locking device powered by the key. As previously described, the key 200 transmits a communications protocol signal and receives a corresponding signal back from the lock authorizing the key to transfer power to the lock mechanism of the lock to change the state of the lock. In the event that the lock mechanism does not successfully change the state of the lock, for example, the user removes the key 200 from the lock before the operation of the lock mechanism is completed, the electronic circuitry of the key does not activate the audio component to emit an initial audio indication (e.g. a "Beep") to indicate to a user that the state of the lock mechanism may not have successfully changed from the locked (secured) state to the unlocked (unsecured) state. Thereafter, the audio component 220 is activated to emit a second audio indication (e.g., "BuzzBuzz") that is different than the first audio indication to indicate to the user that the lock mechanism may not have successfully operated to change the state of the lock. Accordingly, the user is prompted to correct a potential problem by attempting to use the key 200 once again properly to change the state of the lock. It should be noted that the second audio indication may be emitted when the operation of the lock mechanism is not successfully completed or when the user does not maintain the key 200 in contact with the lock (or in sufficient proximity) for a sufficiently long period of time for the lock to complete the communications protocol with the key, regardless of whether the initial status of the lock is locked (secured) or unlocked (unsecured).

In a method according to one embodiment of the invention, a user aligns the transfer port of the electronic key 200 with the transfer port of a cabinet lock and activates the key to initiate the communications protocol. In the event that the lock transmits an "authorized" communications protocol signal to the key 200, the key then transfers power to the lock mechanism of the lock to change the state of the lock. In a particular embodiment, the key 200 transmits a security code signal to the cabinet lock and the key receives a confirmation security code signal back from the cabinet lock to authorize the key to transfer power to the lock mechanism of the cabinet lock, for example, utilizing an inductive power transfer technology. In the event that the lock mechanism successfully changes the state of the cabinet lock from a locked (secured) state to an unlocked (unsecured) state, the electronic circuitry 210 of the key 200 then activates the audio component 210 to emit an initial audio indication to indicate to the user that the cabinet lock is in an unlocked (unsecured) state (e.g. "Beep") followed by a first audio indication (e.g. BeepBeep") that the lock remains in the unlocked (unsecured) state. In the event that the lock mechanism does not successfully change the state of the cabinet lock, for example, from the locked (secured) state to the unlocked (unsecured) state, then the electronic circuitry 210 of the key 200 activates the audio component 220 to emit a second audio indication (e.g., "BuzzBuzz") that is different than the first audio indication to indicate to the user that the operation of the lock mechanism was unsuccessful and that the status of the cabinet lock has not changed, or alternatively, that the communications protocol between the key and the lock was not completed.

It should be noted that a cabinet lock key 200 with audio indicators according to embodiments of the invention may be used with more than one cabinet lock. In the event that the cabinet lock key 200 is used with a plurality of cabinet locks, each successful change of a lock from a locked (secured) state to an unlocked (unsecured) state activates the audio component 220 of the key to emit the first audio indication for a predetermined period of time, for example, about 2 minutes. The memory of the electronic circuitry 210 of the key 200 may store each predetermined period of time in a time bank and increments the time bank an additional predetermined time period (e.g. about 2 minutes) each time the state of another cabinet lock is changed from the locked (secured) to the unlocked (unsecured) state, while simultaneously counting down from the accumulated time bank. Each time the state of a cabinet lock is changed back from the unlocked (unsecured) state to the locked (secured) state, the memory of the electronic circuitry 210 of the key 200 will subtract one increment of the predetermined period of time (e.g. about 2 minutes) from the time bank. In this manner, more than one cabinet lock can be unlocked before the first cabinet lock is relocked without the first audio indication terminating. The electronic circuitry 210 of the key 200 will continue to activate the audio component 220 to emit the first audio indication as long as at least one cabinet lock remains in the unlocked (unsecured) state and the memory of the electronic circuitry of the key continues to contain and count down any portion of a predetermined time period. In one embodiment, this feature of a cabinet lock key 200 with audio indicators according to the invention is referred to as "stacking" the time period of the first audio indicator. It will be readily apparent to one of ordinary skill in the art that the same feature may be provided for the second audio indicator in the event that the state of more than one cabinet lock is not successfully changed before the operation of the lock mechanism of the first cabinet lock is corrected.

In another embodiment, a first audio indicator may be emitted when a state of a first lock has been successfully changed to unlocked, and a second audio indicator different than the first may be emitted if the user attempts to unlock a second lock prior to locking the first lock. Thus, the electronic key 200 may be configured to only lock or unlock one lock at a time.

It is understood that the audio component 220 may be configured to emit any type of audible signal. In addition, the audio component 220 may be configured to emit one or more audible signals to differentiate between different status changes. For example, a successful change in state of the lock may be indicated by a first audio indicator, while an unsuccessful change in state may be indicated by a second, different audio indicator. Moreover, the audio component 220 may be used in conjunction with other components of the merchandise display security system. For example, the audio component 220 may be configured to emit an audio indicator when the electronic key has been fully charged in the charging station 180, or an audio indicator may be emitted when the electronic key has been programmed at the programming station 60. Still further, it is understood that the programming station 60 may be omitted in some embodiments where the electronic key 220 is programmed directly into the electronic key or where the electronic key is preprogrammed.

The foregoing has described one or more embodiments of a merchandise display security system for displaying and protecting an article of merchandise. Embodiments of a merchandise display security system have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A security system for protecting an item of merchandise from theft, comprising:

an electronic key comprising an audio component; and a plurality of merchandise security devices each comprising a lock mechanism that is operated by electrical power transferred from the electronic key to the lock mechanism, wherein the electronic key is incapable of unlocking a second lock mechanism prior to locking a first lock mechanism that has been successfully unlocked, wherein the electronic key is configured to receive a signal transmitted from the lock mechanism indicating a change in state thereof, and wherein the audio component is configured to indicate a status of the lock mechanism based on the change in state thereof.

2. The security system according to claim 1, wherein the audio component is configured to emit an audible signal using a piezo.

3. The security system according to claim 1, wherein the audio component is configured to emit an audible signal in response to the lock mechanism being locked or unlocked.

4. The security system according to claim 1, wherein the audio component is configured to emit a first audible signal indicative of successfully changing a state of the lock mechanism and a second audible signal that is different than the first audible signal and that is indicative of unsuccessfully changing a state of the lock mechanism.

5. The security system according to claim 1, wherein the electronic key comprises electronic circuitry configured to communicate a communications protocol signal between the electronic key and the lock.

6. The security system according to claim 5, wherein the communications protocol signal comprises a security code.

7. The security system according to claim 1, wherein the electrical power is transferred from the electronic key via inductive transfer.

8. The security system according to claim 1, wherein the audio component is configured to continuously or intermittently emit an audible signal for a predetermined period of time.

9. The electronic key security system according to claim 1, wherein the audio component is configured to continuously or intermittently emit an audible signal while the lock mechanism is in an unlocked state.

10. The security system according to claim 1, wherein the audio component is configured to emit: (i) an initial audio indication in response to the lock mechanism being unlocked, (ii) a first audio indication while the lock mechanism is in an unlocked state, and (iii) a second audio indication in response to unsuccessfully changing the state of the lock mechanism, and wherein each of the initial, first, and second audio indications are different than one another.

11. A method for protecting an item of merchandise susceptible to theft, comprising:

transferring electrical power from an electronic key to a lock to thereby lock or unlock the lock;

receiving a signal at the electronic key transmitted from the lock indicating a change in state thereof; and emitting an audible signal with the electronic key in response to the change in state of the lock, wherein the electronic key is incapable of unlocking a second lock prior to locking a first lock that has been successfully unlocked.

12. The method according to claim 11, wherein emitting comprises emitting an audible signal in response to the lock being locked or unlocked.

13. The method according to claim 11, further comprising communicating a communications protocol signal between the electronic key and the lock.

14. The method according to claim 11, wherein transferring comprises inductively transferring electrical power.

15. The method according to claim 11, wherein emitting comprises continuously or intermittently emitting an audible signal while the lock is in an unlocked state.

* * * * *

UNITED STATES PATENT AND TRADEMARK OFFICE

CERTIFICATE OF CORRECTION

PATENT NO. : 8,994,497 B2
APPLICATION NO. : 13/897790
DATED : March 31, 2015
INVENTOR(S) : Jeffrey A. Grant, Christopher J. Fawcett and William M. Warren It is certified that error appears in the above-identified patent and that said Letters Patent is hereby corrected as shown below:

In the Claims

Column 20, line 56, delete "electronic key".

Signed and Sealed this
Thirtieth Day of June, 2015

Michelle K. Lee

Michelle K. Lee
*Director of the United States Patent and Trademark Office*